O. B. JACOBS.
ROTARY ENGINE.
APPLICATION FILED DEC. 17, 1908.
969,957.
Patented Sept. 13, 1910.
8 SHEETS—SHEET 6.
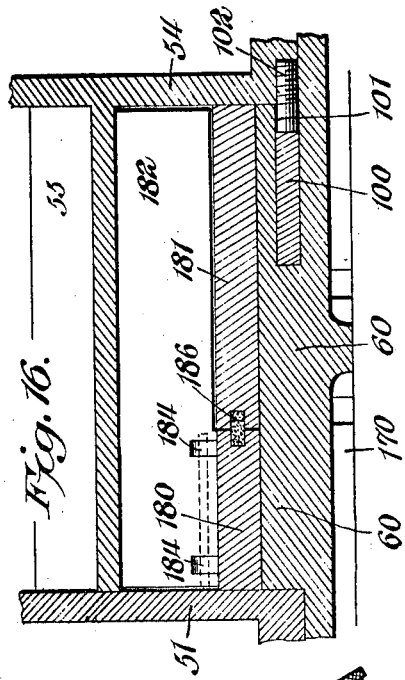
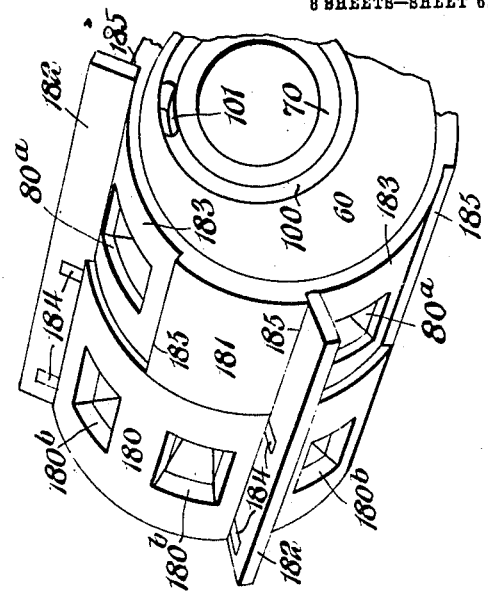
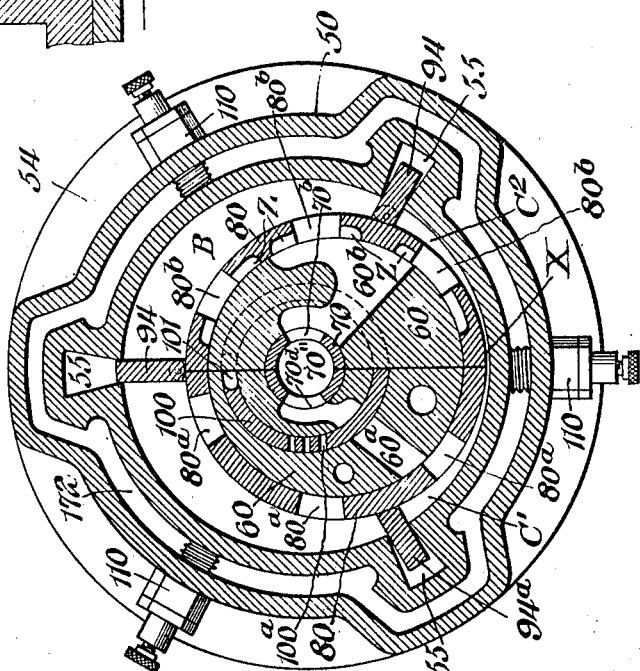
Witnesses
Howard D. Orr.
Fredric B. Wright
Inventor,
Olaus B. Jacobs,
By E. G. Siggers
Attorney

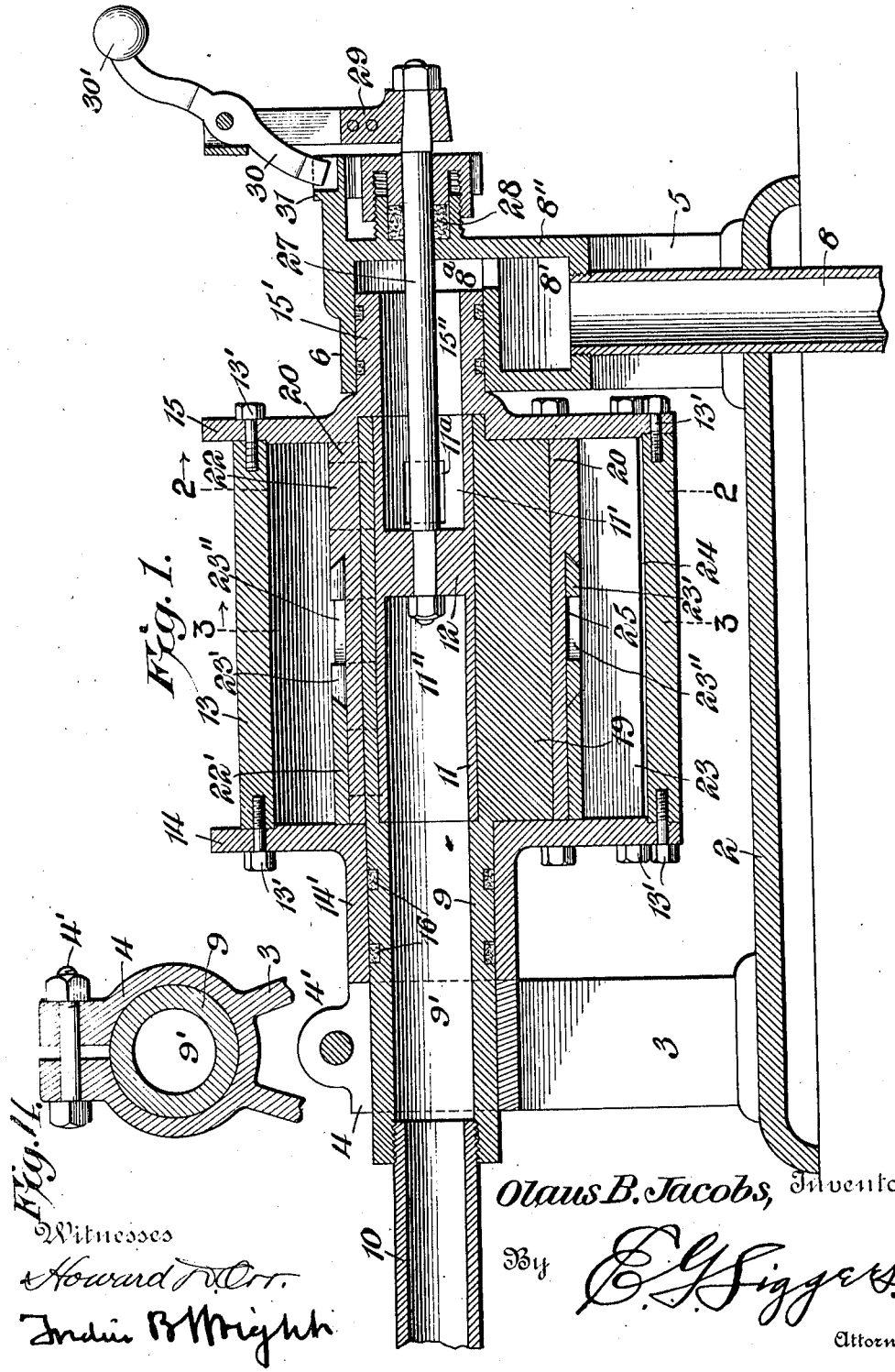

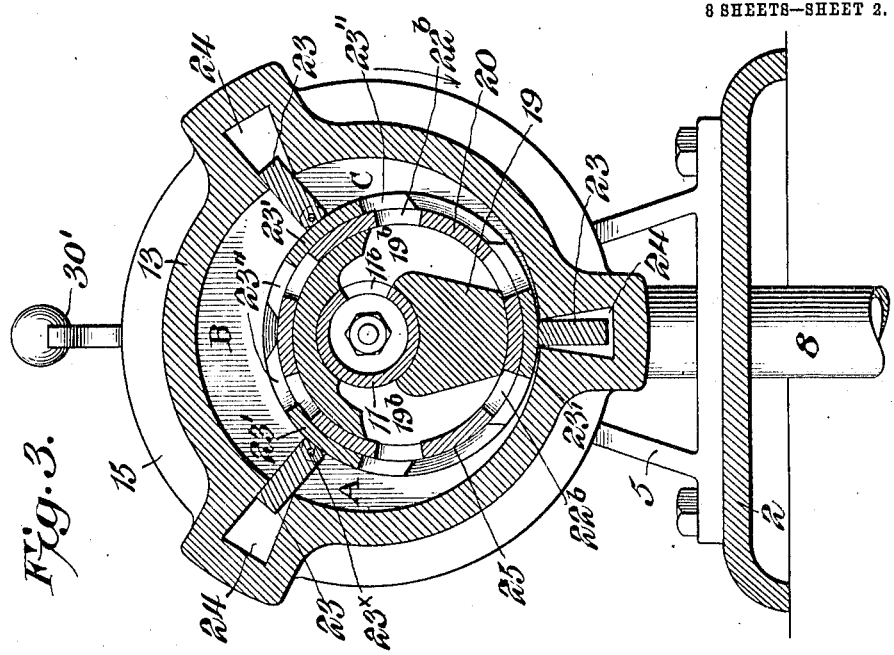
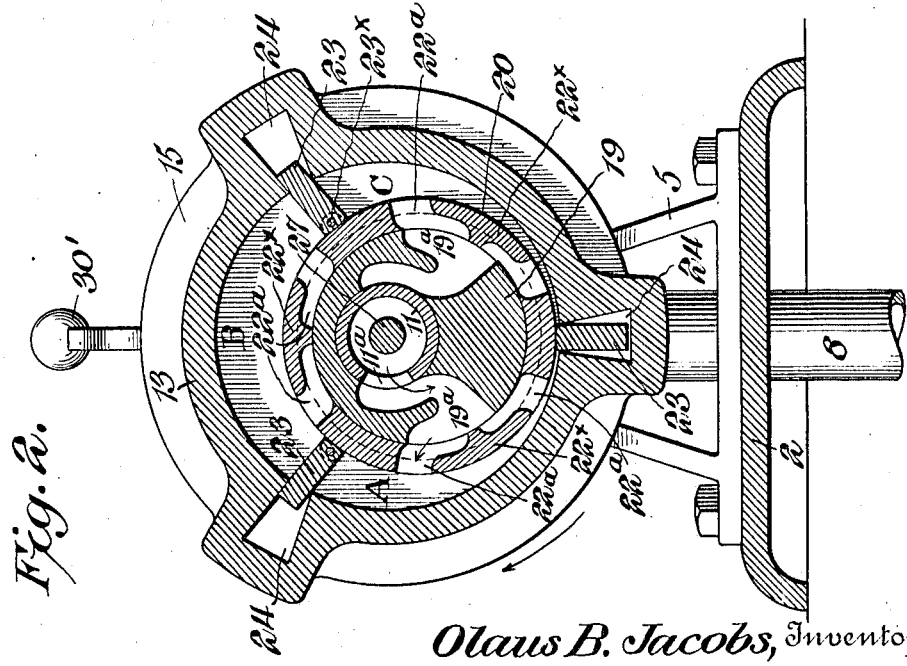

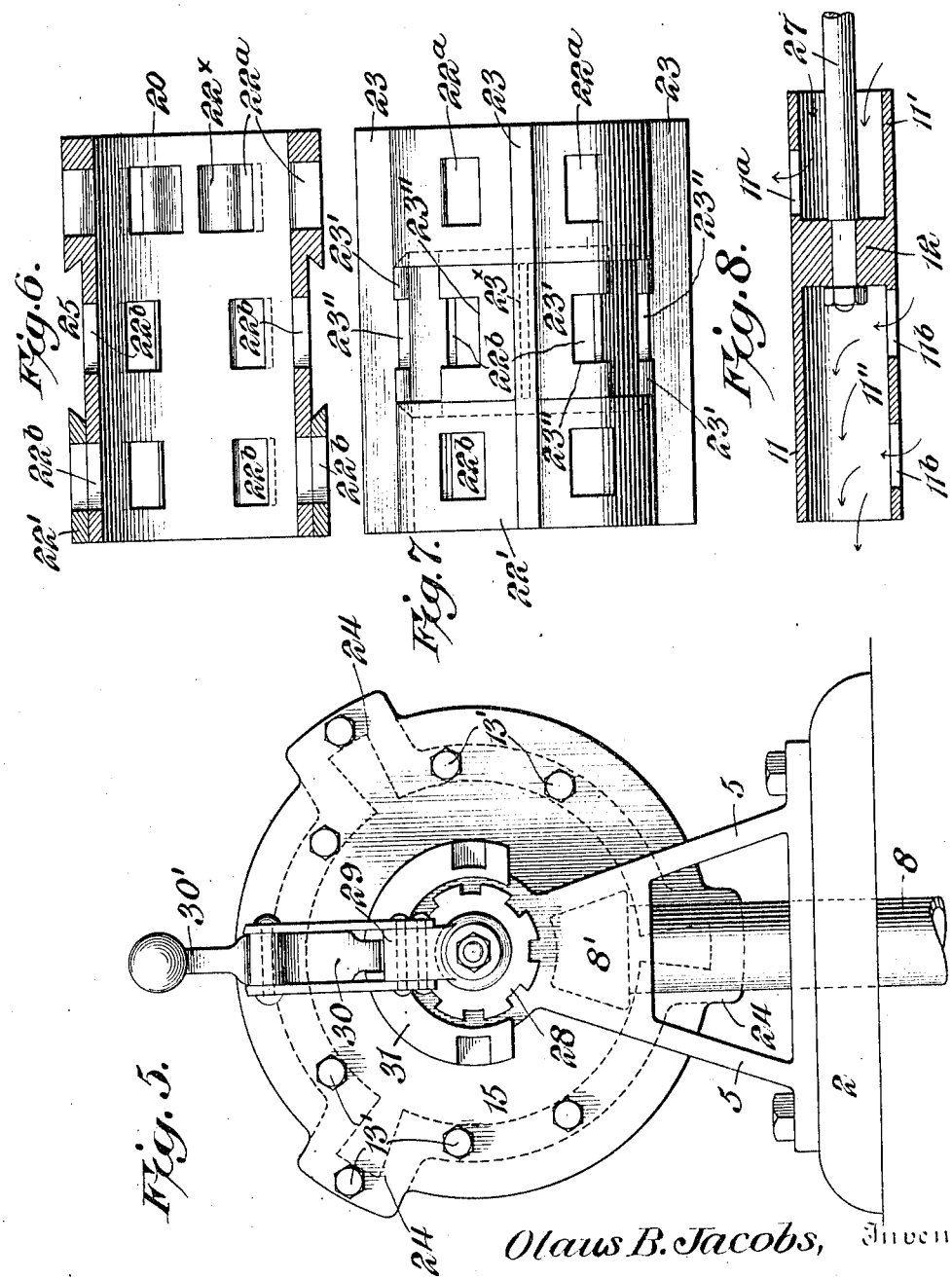

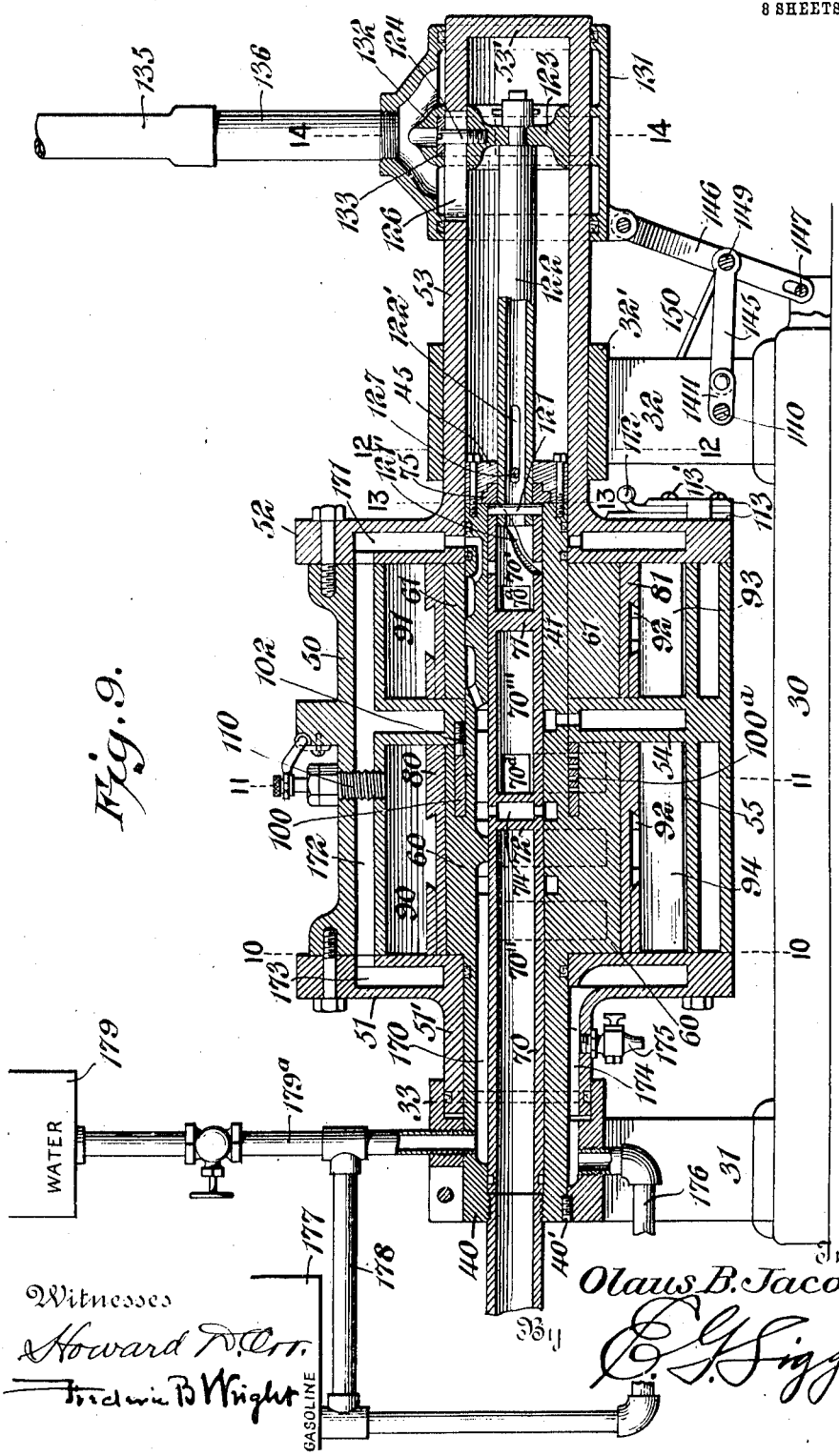

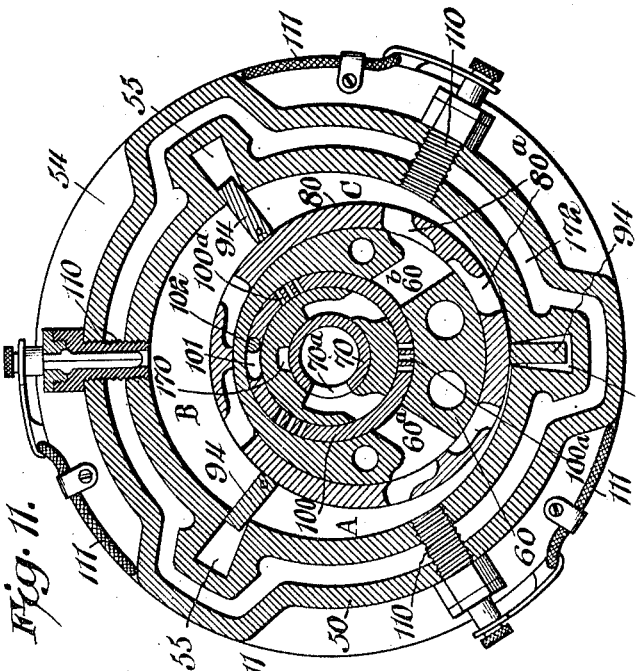
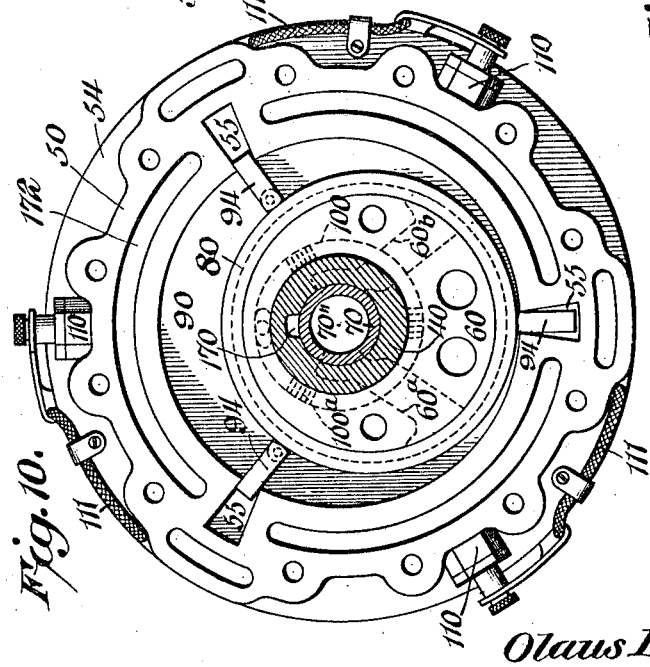
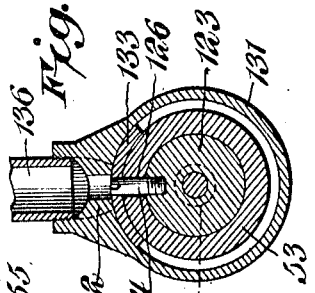
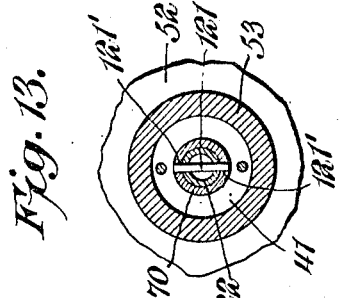
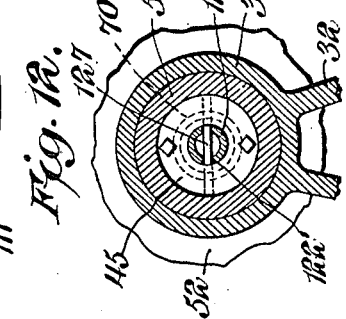

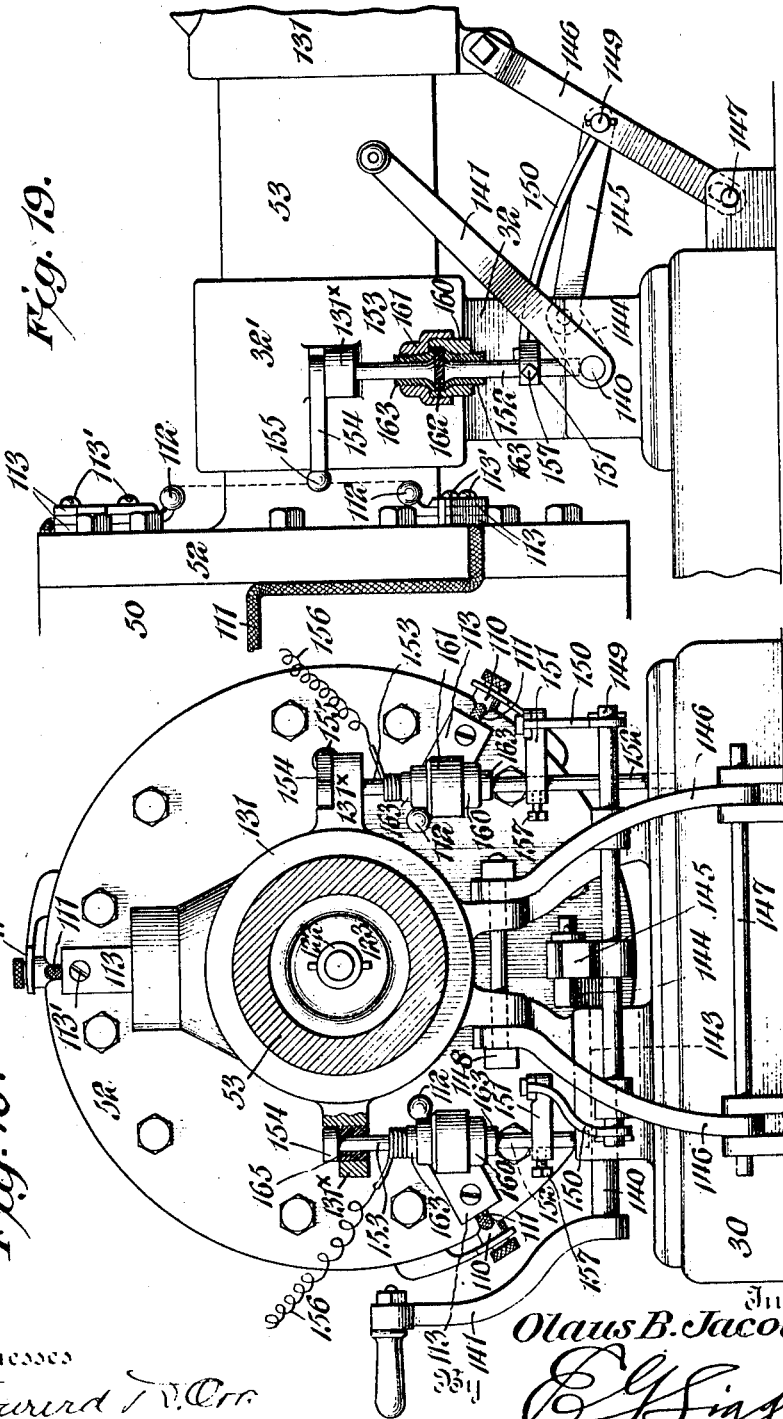

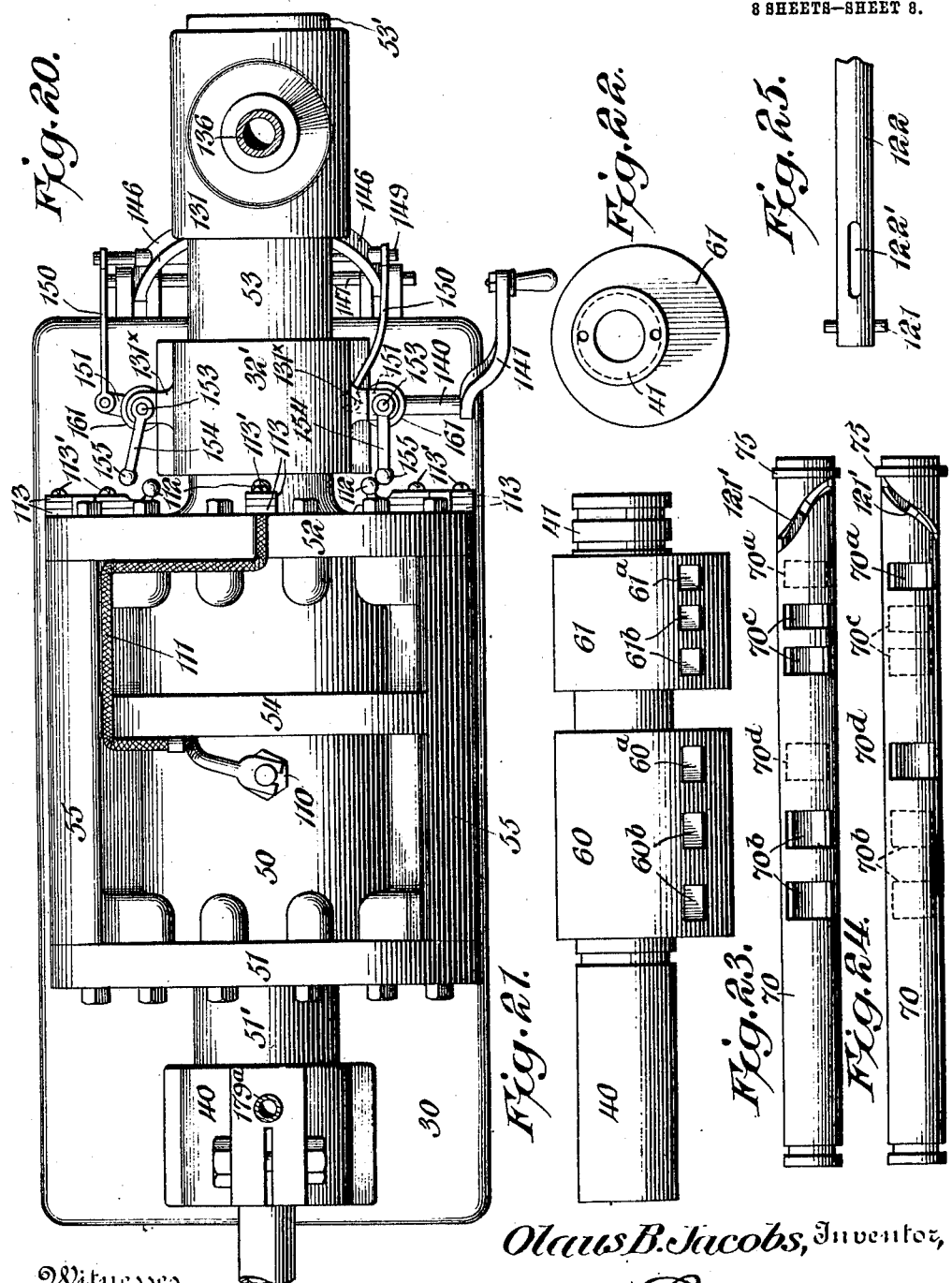

UNITED STATES PATENT OFFICE.

OLAUS B. JACOBS, OF CLEVELAND, OKLAHOMA, ASSIGNOR OF TWO-NINTHS TO ERD C. MULLENDORE, OF CLEVELAND, OKLAHOMA.

ROTARY ENGINE.

969,957.  Specification of Letters Patent.  Patented Sept. 13, 1910.

Application filed December 17, 1908. Serial No. 468,042.

*To all whom it may concern:*

Be it known that I, OLAUS B. JACOBS, a citizen of the United States, residing at Cleveland, in the county of Pawnee and State of Oklahoma, have invented a new and useful Rotary Engine, of which the following is a specification.

My invention relates to rotary engines and particularly to that kind of rotary engine in which an outer cylinder carrying piston blades rotates around a central fixed shaft.

One object of my invention is to provide such a rotary engine as above indicated, in which the outer revoluble piston casing shall relatively rotate eccentrically to the inner shaft, thereby providing a fixed abutment against which the motive fluid used shall act, and a means for forcing the exhausted motive fluid out of the piston space, and, in explosion engines, means for drawing in the charge, compressing it, and afterward forcing out the burned vapors after the explosion.

Another object is to use the central fixed shaft above referred to as a valve casing for the introduction and eduction of the motive fluid before and after use, the several induction and eduction ports being formed in this tubular shaft which is provided with a concentrically arranged cut off. The advantages of this concentric arrangement of piston casing and outlet and exhaust passages and cut offs is obvious as it permits the relative movement of the supply and exhaust openings to be most easily regulated and conduces to simplicity of operation, the pistons to an extent, thus acting to admit and cut off steam or motive fluid.

A further object of the invention is to provide a rotary engine in which the outer revoluble piston-carrying casing, surrounding a fixed eccentrically set tubular member, may be divided laterally into two portions or chambers and the engine then be capable of use with steam expansively or used as an explosion engine, one of said chambers in the latter case being used as a compression chamber and the other as an expansion chamber.

In connection with my peculiar type of engine, I provide means for reversing its movement or stopping it entirely, and I have also devised a system of cooling the cylinder walls thereof and feeding fuel thereto when used as an explosion engine, these two latter inventions being described and claimed in applications, Serial Nos. 457,349 and 457,350, filed by me October 12, 1908.

The simple form of my invention as used for steam or other analogous fluid is shown in Sheets 1, 2 and 3 of the accompanying drawings, while the form of my invention which is adapted to the expansive use of steam or to internal combustion engines is shown in Sheets 4-8 inclusive.

In the drawings:—Figure 1 is a longitudinal section of a simple engine. Figs. 2 and 3 are diametrical sections on the lines 2—2 and 3—3 of Fig. 1. Fig. 4 is a fragmentary detail section. Fig. 5 is an end elevation of the engine and valve operating lever. Figs. 6 and 7 are respectively a longitudinal section and an elevation of the ported valve sleeve. Fig. 8 is a longitudinal section of the inner rotatable valve. Fig. 9 is a longitudinal vertical section of my explosive or double-acting engine adapted to either use steam expansively or to use as an internal combustion engine; Figs. 10 and 11 are vertical transverse sections of Fig. 9 on the lines 10—10 and 11—11; Figs. 12, 13 and 14 are diametrical sections on the lines 12—12, 13—13 and 14—14 of Fig. 9; Fig. 15 is a transverse section through the explosion chamber of the engine, showing one half of the inner cylinder or eccentric in section on a plane taken through one of the inlet passages, and the other half on a plane taken through one of the outlet passages. Fig. 16 is a diagrammatic longitudinal section of a portion of the second piston cylinder, showing a modified manner of attaching the blades to the sleeve; Fig. 17 is a perspective detail, further illustrating this modification; Fig. 18 is an end elevation partly in section; Fig. 19 is a fragmentary side elevation; Fig. 20 is a plan view of Fig. 9; Fig. 21 is a side elevation of the central shaft and the eccentric valve body; Fig. 22 is an end view thereof; Figs. 23 and 24 are side elevations of opposed sides of the central rotatable valve; Fig. 25 is a fragmentary detail of the extremity of the valve operating stem.

Similar reference numerals designate corresponding parts in all the figures of the drawings.

As Figs. 1—8 inclusive not only show one form of my invention but also illustrate the simplest construction thereof, I shall first describe this form.

In its broad features my engine comprises a central fixed tubular shaft, which contains fluid inlet and outlet passages and supports upon it a fixed cylinder which is eccentric to the axis of said shaft. A rotating cylinder casing carrying piston vanes or blades surrounds the eccentric body, said cylinder being concentric to the central shaft. A cylindrical shell or drum attached to the arms or blades surrounds the eccentric body and is rotatable thereon. It is provided with exhaust and inlet ports which are adapted to register with the exhaust and inlet ports in the eccentric body and in the central tubular valve. The eccentric body is nonrotatable and against its outer surface the piston blades carried by the cylinder bear and move. It will be comprehended that the eccentric having a surface eccentric to the inner surface of the cylinder will approach nearer to or farther from the cylinder as the cylinder rotates, and thus the blades must move in or outward radially as they are carried around the eccentric.

In detail the construction is as follows: 2 designates an ordinary base and 3 a standard thereon. The standard 3 has means for supporting and rigidly holding the tubular shaft, said means in the construction shown being a clamping jaw 4 which surrounds the shaft and is drawn tightly against the same by a bolt 4'. The opposed standard 5 does not support the central shaft, but instead rotatably supports the outer end of the outer cylinder, and hence is provided with a journal bearing 6 of any convenient construction. This standard is further formed with a steam supply inlet pipe 8 and a steam chamber or head 8' to be later described in detail.

*Central tubular valve.*—Mounted on the standard 3 is the tubular fixed shaft 9 which connects at its outer end to an exhaust pipe 10 to form an exhaust passage 9'. From about the middle of its length to the other end the shaft 9 is interiorly enlarged to receive an internal partially rotatable tube or lining section 11 forming a central valve which is divided at its middle into two portions by a transverse web 12. One portion 11" communicates with the exhaust passage 9', while the other 11 communicates with the axial passage formed in the cylinder end and has in its circumference the inlet port 11ᵃ. In Fig. 8 is shown a detail section of this tubular valve 11, and it will be seen that the exhaust portion 11' is formed with two exhaust ports 11ᵇ.

*Exterior piston cylinder.*—Mounted rotatably on the exterior of the shaft 9 is the cylinder 13 formed of a shell closed at the ends by the heads 14 and 15, each of these heads being formed with the central annular hubs 14'—15'. The hub 14' surrounds the exterior of the central shaft 9 and rotates against the packing rings 16, while the hub 15' is carried in the bearing 6 and its central tubular portion 15" which registers with the open end of the valve 11, opens into the inlet chamber 8ᵃ formed in the head 8'. The heads are attached to the cylinder in any way best adapted to the purpose, as by the tappet bolts 13'.

I do not wish to be limited to the precise manner of forming the cylinder and heads 13, 14 and 15, as they may be made in any convenient and practicable manner, preferably, however, I form them in three portions joined and connected by the bolts 13'. This permits the heads to be readily detached from the cylindrical shell and the rotary valves or blades to be set or adjusted when desired.

That portion of the central shaft 9 which is located beneath the space between the heads 14 and 15 is enlarged and cam-shaped in cross section, as at 19. That is the periphery of this enlarged portion 19 is eccentric to the axial center of the shaft 9. This enlarged eccentric portion 19 I shall hereafter term "the fixed eccentric-body."

Surrounding the annular eccentric body 19 is a cylindrical sleeve 20, an elevation and a section of which is shown in Figs. 6 and 7. This sleeve extends from one end of the cylinder space to the other between the heads 14 and 15 and revolves with the cylinder 13, it being connected to the cylinder by the blades 23 as will be hereafter described.

*Inlet and exhaust port system.*—The central valve 11 has one inlet port 11ᵃ and as will be seen from Fig. 2, the annular eccentric body is formed near one end with the opposed inlet passages 19ᵃ. These open at their inner ends to the interior of the valve body and therefore against the periphery of the tubular valve 11. They will hence register with the inlet port 11ᵃ at their inner ends. The passages 19ᵃ are circumferentially flared to provide an enlarged mouth adapted to coact with a plurality of pairs of inlet ports formed in the cylindrical sleeve 20. This sleeve, as will be seen from Figs. 6 and 7, is provided at one end with a series of three pairs of inlet ports 22ᵃ. These ports 22ᵃ are arranged in pairs, a pair to each piston space. The mouths of each pair of inlet ports are separated from each other, that is the outer end walls of the port extend radially inward through the sleeve toward the center thereof, while the inner ends of the ports extend inward and then toward each other and then downward. This brings the entrances of the two ports adjacent while the outlets are spaced apart by a bridge piece $22^x$. The mouth of each inlet passage $19^a$ is circumferentially extended so that the port $19^a$ when in engagement with one port $22^a$ may also register with the other port of the pair. This pair of inlet ports may be made as one elongated port, but for the fact that this would tend to weaken the shell 20. The bridge piece $22^x$ acts to strengthen this shell, and at the same time serves also to retard the inrush of vapor in a backward direction until the blades 23 have passed the central points thus helping the movement from the central position, the openings not registering until the central point is passed. My purpose in using the bridge pieces $22^x$ is to slightly retard the backward flow of vapors during the opening of the ports. It will be seen from Fig. 2 that there is one inlet port in the central valve 11, two inlet passages or ports in the eccentric valve body 19 and three pairs of inlet ports in the rotating sleeve 20. It will therefore be evident that the central valve can only register with one of the inlet ports in the eccentric 19, that only two of the inlet ports $22^a$ can register at the same time with the passages $19^a$ and that therefore one pair of inlet ports $22^a$ must be entirely closed by the solid portion of the eccentric body 19 while steam can only enter through one set of inlet ports $11^a$, $19^a$, $22^a$ into one of the piston spaces A, B, C.

*Eduction ports and valve body.*—The eduction portion 11″ of the central valve 11 is provided with two eduction ports $11^b$ diametrically opposed to the inlet port $11^a$ and in line with each other. The eccentric valve body also has two parallel series of eduction passages $19^b$ opening at their inner ends against the periphery of the tubular valve 11 and adapted therefore to register, one or the other with the eduction ports $11^b$.

The sleeve 20 is correspondingly ported, as is shown in Figs. 6 and 7, it being provided with two parallel series of eduction ports $22^b$, and there are six of these ports arranged in pairs, two for each valve space. The ports of each pair are adapted to register with the flared mouth of an eduction passage $19^b$, while one of the passages $19^b$ and only one is adapted to register with the eduction ports $11^b$ in the valve body 11. Thus the passages $19^b$ on one side of the eccentric body are closed to the central valve while the opposed ports $19^b$ are open to the central valve and to the ports $22^b$ registering therewith. There are three sets of ports $22^b$ which are relatively fixed with relation to the piston space immediately outside it, and it will also be seen from Fig. 3 and from Fig. 8 that the eduction ports which are opposed to the inlet ports are opened while the eduction ports in the same diametrical position as the inlet ports $22^a$ are closed. Thus it will be seen that the piston space A (Fig. 3) will be receiving steam while the cylinder space B will neither be receiving nor exhausting the steam and the cylinder space C opposed to the space A will be exhausting.

*Piston blade construction.*—As before stated, the shell 22 rotates with the exterior cylinder 13, and its ports $22^a$, $22^b$ move across the ports $19^a$, $19^b$ of the fixed eccentric, thus cutting off or opening these ports to permit the inlet of live steam and the outlet of exhausted steam.

The piston blades of my engine are designated by the numeral 23. The piston blades must of course rotate with the outer cylinder and equally they must have steam tight engagement with the periphery of the eccentric valve body 19. This engagement I produce by pivoting the piston blade to the sleeve 22. In order to provide for the relative outward movement of the blades as the outer surface of the eccentric nears the inner surface of the cylinder 13, at the lowest point of rotation of the cylinder, I provide three transverse pockets 24 extending longitudinally across the cylinder, one for each blade which permit the radial movement of the blades, and engage the blades with the cylinder for a rotative movement. Because of the fact that the cylinder 13 has a different longitudinal axis from the sleeve 20 and eccentric 19, the blades 23 will change their radial angle within certain limits according to their position on the cylinder. I make the pockets 24 therefore with outwardly inclined or flared side walls, as shown in Figs. 2 and 3. These figures show the different radial positions assumed by the blades at their different points of revolution. It will be seen that this construction not only permits the blades to vary their angle but relieves the piston blades of a great deal of frictional contact with the side walls of the pockets. The blades contact only with the corners of the pocket walls and have a turning movement thereon. It will also be seen that the steam or other motive fluid will hold the blade in contact with the pocket wall, and make a relatively tight joint.

From Figs. 2 and 3, it will be evident that owing to the greater diameter of the cylinder 13 over the eccentric 19 and the varying distance between them, the blades must constantly vary at their inner edges from each other, depending upon the degree of their projection toward the axis of the cylinder and that provision must be made for this variation that they cannot therefore be rigidly fastened to the sleeve 20, but must not only be pivoted to the sleeve to allow of different radial angles but also must be allowed to shift circumferentially around the shell within a certain limit of movement. To provide for this movement, I form a circumferential guideway around the shell preferably in the form of a groove 25 dovetailed in section (see Fig. 6) extending around the middle of the sleeve 20.

The blades are each provided with a base 23' (see Fig. 7) having beveled side edges fitting the inside edges of the groove. This base is cut away at its middle as at 23'' to prevent these sliding blades from at any time closing the middle ports 22$^b$ in shell 20. In order to conveniently engage the blades with the shell 20 I form one end of the shell with the thickened portion 22, the edge of this thickened portion being undercut to form the dovetailed end of the groove and I form the other wall of the dovetail groove by sliding the sleeve 22' over the other end of the shell as shown in Fig. 6. The blades are pivoted each to its respective head 23' by a pivot pin 23$^x$ engaging ears on the base. Any suitable pivoting arrangement, however, may be used.

*Central valve operating mechanism.*—It will be evident that the rotary valve 11 must be turned on its axis in order to start, stop or reverse the engine. In this instance, I provide the spindle 27 which at its inner end is attached by a nut to the web 12 and at its outer end is connected to a suitable rotating handle. As I might use a number of other arrangements for this purpose, I do not wish to be limited to this particular form. I prefer to extend the spindle out through a stuffing box 28 formed on the head 8' and attach to its end a bifurcated crank arm 29 between the legs of which is pivoted a latching handle 30 whose inner end—in consequence of the weight on arm 30'—normally engages with an arc 31 formed on the head 8'' and surrounding the stuffing box. This arc has three recesses in it into which the end of the latch engages in the three different positions of the central valve. The gland of the stuffing box is serrated to permit it to be turned outward or inward. It will be seen that the open end of the hub 15 opens into the chamber 8$^a$ in head 8'' and this in turn connects with the chamber 8' into which live steam or other motive fluid is admitted by pipe 8.

In the description of my operation, I shall refer to steam as the motive fluid, but my device might be used with any other expanding gas or vapor to which it is adapted.

*General operation.*—The operation of this simple form of my improvement is as follows:—It is seen that three piston spaces A, B and C are provided, one between each two piston blades. The bottom of said spaces is formed by the sleeve 20 and each space has opening to it a pair of separated inlet ports 22$^a$ and a pair of separated outlet ports 22$^b$.

It will also be seen that the fixed eccentric has in it two wide mouthed inlet passages 19$^a$ opposed to each other and two wide mouthed outlet passages 19$^b$ also opposed to each other, and that the rotary tubular valve 11 has one inlet opening adapted to register with either one of the inlet passages 19$^a$ and a pair of outlet openings 11$^b$ adapted to register with either pair of opposed outlet passages 19$^b$ in the valve body 19. It will also be seen from Fig. 2 that the inlet passages 19$^a$ register with the pair of inlet ports 22$^a$ and that when the inlet port is opened to one of the piston spaces as A, the outlet port from that space is closed but that the outlet ports are opened from the opposed space C, assuming that the engine is moving in a direction of the hands of a clock or in the direction shown by the arrows in Figs. 2 and 3. Steam will enter through the pipe 8, chamber 8' and tubular passage, through the hub 15' into the inlet end 11' of the valve 11, thence by port 11$^a$ through the registering passage 19$^a$ and registering ports 22$^a$ to the piston space A, shown in Figs. 1 and 3. The steam cannot get out of this space because the exhaust ports on the same side are closed as will be seen from Fig. 3, and therefore must act against the blade 23, a fixed abutment against which the steam can act being formed by the conjunction of the sleeve 20 with the wall of the cylinder 13. The steam will therefore force the piston blade 23 forward until the rearmost port 22$^a$ of the space A has passed the flared mouth of the passage 19$^a$. When the parts occupy the position shown at B in Fig. 2, the steam in this case has exerted its force and is doing no work, and the steam space is cut off either from the inlet of steam or the outlet thereof, as is the space B. Taking now the position of the parts as shown with relation to the piston space B, it will be seen that as the cylinder 11 continues to rotate, the blade 23 will be forced outward by the gradual approach of the surfaces of cylinder 13 and of the sleeve 20. Thus the space between these two surfaces, or in other words the piston space, will be continuously contracted. At the same time the eduction ports 22$^b$ will register with the eduction passages 19$^b$ which is in register with the port 11$^b$, and that upon this registration of these ports, the exhausted steam in that piston space will be gradually forced out until such time as the surfaces are brought absolutely together, which will occur at the lowest point of rotation. At this time, all of the live steam has been forced out of the space by the rolling contact between the eccentrically set sleeve and the inner face of the cylinder 11. As the outer cylinder and the inner cylinder pass the lowest point of rotation the walls will gradually draw apart, at the same time, the induction ports of the sleeve will register with the induction passages 19ª and 11ª, and steam will once more enter the piston space. It will be seen that the elongation of the inlet ports and of the outlet ports, or what is the same thing, the use of two ports, prolong the period of steam admission and of release.

By means of the lever handle 30 and crank 29, the spindle 27 may be rotated so that the ports 11ª, 11ᵇ may be turned either upwardly against the blank interior face of the eccentric valve body or to one side or the other into register with inlet ports on one side or the other. Thus steam may be directed either to one side of the piston or to the other, thus changing the direction of the engine or the inlet to steam may be cut off entirely when the rotatable valve is turned so that its port is entirely closed by the blank portion of the eccentric cylinder It is of course obvious that the valve may be held in any position desired by the latch lever 30 and that the size of the inlet and exhaust openings in the valve 11 may be varied by more or less rotation of the spindle 27, a greater or less portion of the ports 11ª, 11ᵇ being obstructed by the wall of the eccentric, 19. It will also be evident from Figs. 2 and 3 that the pistons in the course of their revolution with the cylinder 13 will have a circumferential movement backward and forward, upon the exterior of the sleeve 20 depending upon the variation in their angular direction.

*Expansion or internal combustion engine.*—The general principle of the engine heretofore described is also found in the form shown in Figs. 9 to 13, inclusive. The first form comprised briefly an outer cylinder and an internal cylinder eccentric to each other, blades carried by the outer cylinder contacting with the inner, and an inlet port and an outlet port diametrically opposed to each other and located at opposite ends of the cylinder. The form now to be described is precisely the same in general except that two conjoined piston cylinders are used, thus forming two separate chambers, one of which is used directly or for the compression of motive fluid, while the other is for the purpose of using steam expansively or for the explosion of a charge, the valve mechanism being practically duplicated except that a conducting chamber is formed for conducting the steam or fluid from the first chamber to the second, and that one inlet passage through the eccentric forms a loading chamber in the explosion engine. In other words, what may be termed the inlet end of the cylinder is divided from the outlet end thereof by a partition, one of these spaces being used as a compression chamber in gas engines, and the other as an explosion chamber. This change necessitates various subordinate changes in the mechanism, particularly where the engine is to be used as an explosion engine and requires an additional element, providing for firing the charge, rotating the internal valve when the engine is reversed and corresponding changes in the igniting devices adapting it to fire on one side of the engine or the other, and means for preventing back firing to the compression chamber.

Referring more particularly to Fig. 9, 30 designates a base having thereon the standards 31 and 32. The standard 31 supports the end of the central fixed tubular shaft 40, the shaft being prevented from any rotative movement by any suitable means, as by the clamp shown in Fig. 4 or by the key 40'. The standard 32 supports the journal bearing 32'.

*Outer cylinder, eccentric and internal valve.*—Surrounding the shaft 40 is the rotatable cylinder 50 having hollow walls at its ends bolted to the heads 51, 52. The head 51 has a hub 51' which surrounds and rotates upon the shaft 40, the end of the hub being received in an annular gland or bearing 33. The head 52 has at its center the tubular extension 53 corresponding to the hub 51' but longer and closed at its ends by a web 53'. The tubular extension 53 is rotatably supported in the journal 32'.

Surrounding the shaft 40, and preferably, though not necessarily made in one piece with it, is the eccentric body 60 which is of the same width as the piston casing 50, and projects into the same. This eccentric is fixed of course, and its center is eccentric to the center of the outer cylindrical piston cylinder. Thus as the outer cylinder revolves around the center, the walls of the two cylinders approach and recede from each other. Within the central eccentric cylinder is the tubular valve 70 open at both ends but divided transversely into three chambers or compartments 70', 70'' and 70''' by the transverse walls 71 72. The wall 72 is hollow, providing a chamber 74. 70' is the inlet chamber 70'' the exhaust chamber, and 70''' an intermediate conducting or compression chamber. The chamber 74 will be later described.

*Piston blades and piston chambers.*—An inwardly projecting transverse partition or wall 54 divides the piston chamber into two lateral halves, this wall being preferably hollow and connecting with passages or channels 171, 172, 173, formed in the walls of the cylinder 50 and heads 51 and 52, forming a part of a cooling or supply system described in another application, Serial No. 457,350, filed by me on the 12th day of October, 1908, and hereafter more fully referred to. While I have shown the piston cylinder formed in one piece and divided by the partition 54, it will be seen that there are practically two chambers, the second larger than the first, and that each one of these chambers is practically the same as the piston chamber shown in Fig. 1 and heretofore described.

The eccentric 60 is grooved to receive the inner end of the wall 54, and in order to practically form this groove so that the cylinder may be properly placed in position, I form one-half of the eccentric in the form of a sleeve 61, which is forced onto the central shaft portion or core 41 of the eccentric after the cylinder is put in place. The sleeve 61 may be held in place by shrinking upon the core 41 or by pinning it thereto.

Surrounding the eccentric body 60 and rotatably mounted thereon are the sleeves 80, 81, of the same construction as before described, each one being circumferentially-grooved for the engagement with a base 92 having outwardly beveled side edges. The blades, 93, 94, are pivoted to the base 92 in the same manner as previously described as with reference to the blades 23. There are, of course, two series of blades, one for each of the piston chambers. The outer ends of the blades are received in transverse pockets 55 having outwardly inclined walls, as previously described to permit variation in angular directions of the blades, as shown in Figs. 2, 3 and 11.

*The port system.*—While in the first form described there was only one series of inlet passages and of outlet passages, in the form now being considered—where steam is to be used directly in one chamber and expansively in the other, or a charge is to be compressed in one chamber and then exploded in the other, it is obvious that a third intermediate valve chamber must be used between the inlet and outlet portions of the valve, and that, hence, ports and passages must be used to carry the motive fluid to the first chamber of the cylinder to carry it out therefrom into the intermediate valve chamber, out therefrom into the second piston chamber and from thence into the exhaust pipes. To these ends therefore I provide in the tubular valve, 70, the inlet port, 70$^a$, and in the inner chamber, 70''', two transferring ports, 70$^c$, alining with the outlet from the first piston chamber; and the transferring ports 70$^d$ leading to the second chamber, all located in valve chamber 70''', while the chamber 70'' is provided with two sets of exhaust ports, 70$^b$.

The inlet end of the eccentric body 61 is formed with opposed inlet and outlet passages of the same form and location as the inlet and outlet passages shown in Figs. 2 and 3, and Figs. 2 and 3 are, therefore, practically sections through opposite ends of the first piston chamber. The eduction passages of the first chamber, however, connect with the ports, 70$^c$, of the central rotatable valve, and conduct the steam or compressed gases from the first piston chamber into the intermediate valve chamber, 70'''.

The sleeve, 81, surrounding the eccentric portion 61 is precisely the same as the sleeve, 20, previously described with relation to Figs. 2 and 3, and is likewise provided with the one series of inlet ports 61$^a$ and the two parallel series of outlet ports 61$^b$ which register with the two parallel series of outlet passages formed in the eccentric and leading to the interior thereof where they register with the two series of ports, 70$^c$, in the rotatable valve.

*The second piston chamber and its port.*—The second piston chamber is in general features like the first. The eccentric 60 is provided with opposed inlet passages 60$^a$, see Fig. 15, and with two series of opposed outlet passages 60$^b$, the inlet passage 60$^a$ registering with the port 70$^d$ in the tubular valve and the two outlet passages 60$^b$ registering with the outlet ports 70$^b$ of the valve. It is to be understood of course that the port 70$^d$ and the ports 70$^b$ are on diametrically opposed sides of the tubular valve so that when one inlet port on one side of the engine is opened, the other inlet port will be closed, and that those outlet ports will be opened which are opposed to the inlet, this being precisely the same arrangement previously described, as in Figs. 2 and 3. The eccentric is also provided with the sleeve 80 corresponding to the sleeve 81 of the first chamber, and is provided with the three rows of ports, as shown in Figs. 6 and 7.

It will be obvious from the description above given that each of the piston chambers with its blades, sleeve and eccentric is precisely the same as the piston chamber previously described, as far as its general construction is concerned; and that each of these chambers is therefore provided with means for the induction of motive fluid at one end of the chamber and the eduction of motive fluid at the other end of the chamber. When the blade has passed around the chamber and in its passage cut off the inlet port, explosion will occur and the exhaust ports will be opened to permit the discharge of the burned gases.

It is to be noted that the exhaust ports 80$^b$ of the ring 80 are extended circumferentially on their inside ends, as shown in Fig. 15 so that the inlet port on one chamber is opening or starts to open just before the exhaust in the opposed chamber has closed. This is for a purpose later described.

*Explosion chamber cut off mechanism.*—While the mechanism heretofore described is sufficient to provide means for using steam expansively, to permit the second piston chamber to be used for an explosion of a charge, it is necessary to provide means whereby the second piston chamber shall be cut off from any connection with the chamber 70''' and thereby with the compression or first chamber of the engine.

In describing the peculiar details of construction which fit my engine to be used as an internal combustion engine, I shall refer to the first chamber as the inlet and compression chamber and to the second chamber as the explosion chamber.

As will be seen from Fig. 11, the inlet passages 60ª to the explosion chamber extend from the hollow center of the eccentric to the exterior thereof where they connect with cut off ports in the sleeve 80, as described. Intermediate of the interior and exterior of the eccentric 60 I place a rotatable ring 100 which is provided with ports 100ª equal in number to the spaces between the pistons and adapted in the revolution of the ring to register with the passage 60ª. While I might use a port having an area equal to the cross section of the passages 60ª, this would weaken the ring too much, and I therefore provide the ring at these points with perforations for the passage of the motive fluid. These perforations act also to more thoroughly mix the charge before it enters the explosion chamber. I do not wish to limit myself to the use of perforations, as any form of ports are the equivalent therefor.

As the eccentric 60 is fixed, means must be provided whereby this internal ring or band 100 may rotate with the exterior rotating piston cylinder, and to this end I form one end of the ring 100 with a recess 101, into which projects a pin 102 which is engaged with the wall or partition 54 at its inside edge. This pin I have shown as in the form of a screw, but of course the details of this construction may be varied in many ways. It is to be noted that the recess 101 is longer than the diameter of the screw pin 102 so as to allow for a certain amount of play between the parts and a certain variation in the relative position of the ring and blades when the cylinder is being rotated in opposite directions. This is necessary in order that the ports of the ring may not be in line with the ports 80ª and so that as shown in Fig. 22, the ring ports will register with the ports of the eccentric before the eccentric passages and the sleeve ports register, the reason for this being shown later. If the engine was only going to move in one direction, the ring 100 could be set so that it ports 100ª would be permanently in advance of the ports 80ª, but as the engine is to be reversed, it is necessary to provide means such as the elongated pin slot, whereby the ring may have a certain lag in its movement or shift so as to carry its ports ahead of the sleeve ports, whether the engine is moving in one direction or the other. There are other functions of the ring 100 in connection with a self-igniting means, which will be brought out later.

*Ignition.*—The igniter for the explosive engine shown in Fig. 9 consists of three spark plugs 110 of any usual or desired construction, which are screwed into the piston casing at a point between the blade pockets. The spark plugs are connected by means of the wires 111, each to a contact member 112, which is attached to the end of the cylinder 50, as shown in Figs. 9 and 18. This connection may be made in any suitable manner, but I have shown two insulating plates 113 clamped together by screws 113' between which the end of the wire 111 is received, and between which the end of the contact ball 112 is also clamped. There are of course three contact members 112 corresponding with the three piston chambers A, B and C. These, in the rotation of the piston chamber, contact with a contact member 155, held within the orbit of the contact members 112. There are two of these contact members 155, one on each side of the engine adapted to be used, one when the engine is running in one direction and the other when the engine is running in the reverse direction. The mechanism whereby one or the other of the contact members is thrown into the path of movement of the contact members 112 will be hereafter described.

While the crank and latch construction for rotating the interior valve 11, as shown in Fig. 1, might be used for rotating the interior valve 70, shown in Fig. 9, I preferably use another means. To that end, preferably the tubular valve 70 is flanged at its end, as at 75, and is engaged by an interior flanged ring 45 bolted to the end of the shaft 40. This construction allows the tubular valve to be inserted within the core of the eccentric and then to be fastened in place by applying the ring 45. This ring also holds in place a pin 121, which projects transversely through a tubular spindle 122, as clearly shown in Fig. 9. The end of this pin 121 projects into a spiral slot or groove 121', shown clearly in Figs. 19 and 20 which surrounds the extremity of the tubular valve 70. It will be obvious that upon a longitudinal motion of the spindle 122, the pin and slot connection will cause the valve 70 to be rotated in one direction or the other depending upon the direction of movement of the spindle 122. This spindle is guided in its movement by a pin 127 which passes transversely through the ring 45 and through a longitudinal slot 122' in the spindle. The spindle is thus held from any rotation, and is limited in its forward and backward movement, pin 127, acting as a stop.

At its extremity, the spindle 122 is connected to a circular cross head 123 which fits and slides within the extremity of the tubular portion 53. The cross head is provided with a pin 124 projecting up therefrom and outward through a slot 126 formed in the tubular portion 52.

131 designates a casing surrounding the exterior of the tubular portion 53, and movable longitudinally therealong. This casing is hollow, and at its middle is provided with a circumferential bridge piece 132 which is grooved on its inside diameter for the reception of a segment 133, this segment being connected to the cross head of the projection of the pin 124 therethrough.

It will be obvious from the description and the drawings that as the tubular portion 53 must revolve with the piston cylinder, it is necessary that the cross head 123 should also revolve, and that this revolution of the cross head, its attached spindle 122 and the tubular portion 53 is attained by means of the pin 124, which connects these parts, and that the segment 133 has a revolution within the groove formed on the inner face of the bridge-piece 132. While at the same time it must move backward or forward as the casing 131 is moved. As a consequence when the casing 131 is moved, the spindle will also be moved and the rotatable valve 70, will be turned in one or the other direction, as before noted. The casing 131 also acts as a supply chamber, and is therefore connected to a supply pipe 136 which may either pass to a source of steam supply or to a source of motive fluid supply, such as gasolene or other hydrocarbon. Preferably, however, where my engine is being used as an internal combustion engine, I provide another system for supplying the motive fluid. A flexible pipe 135 connects the pipe 136 with any suitable tank or carbureter.

In order to slide the casing 131 backward or forward, upon the tubular portion 53, I preferably provide a shaft 140, to which is connected a crank handle 141. This shaft passes inward from one side of the engine through a suitable bearing 143 formed on the base of the engine to the vertical center thereof, where it is provided with the crank arm 144, which in turn is connected by a link 145 to a lever 146 which is pivoted at its lower end to the portion of a base as at 147. The upper end of this lever is pivoted to the casing 131 so that as the crank 141 is turned in one direction or the other, the casing 131 will be shifted back or forth. The lever 146 is preferably formed with two arms, as shown in Fig. 18, which are pivoted at their lower ends to the rod 147 and at their upper ends are connected by the bolt 148, which passes through ears formed on the casing 131. Preferably the connecting rod 145 is pivoted on a transverse rod 149 which passes through the two arms of the lever 146, as shown in Fig. 18, and is connected at its ends to inwardly projecting arms 150, which in turn are pivoted to horizontally movable crank arms 151 mounted upon vertical shafts 152, one on either side of the engine. Set screws 157 permit the crank arms to be adjusted in the precise position required for effecting the operation.

The crank shafts 152 are coupled at their upper ends by an insulating coupling, each to a vertical shaft 153 which carries at its upper end an arm 154 having at its extremity the contact member 155. The upper shaft 153 is connected by wires 156 to any suitable source of electricity or sparking mechanism. It will be seen that a rotation of the shafts 152, 153 causes the arms 154 to move inward or outward and it will be noted from the drawings that the crank arms 151 project in the same directions from the shafts 152, and that therefore an inward movement of the arms 150 tends to revolve the shafts 152—153 in the same direction, thus moving one of the contact members 155 inward into the path of movement of the contacts 112 and the other contact member 155 outward and away from the path of movement of the rotating contacts. My mechanism therefore provides that when the interior valve is rotated to actuate the engine in one direction, the proper contact members shall be brought into the path of movement of the rotating or engine contacts, while when the engine is reversed, the other contact member will be brought into this path, and the first contact member thrown out of the path. This is of course necessary inasmuch as in one case, the firing chamber is on one side of the engine while in the other case the firing chamber is on the diametrically opposite side of the engine.

While of course I do not wish to be limited to the exact detailed construction I prefer to use the form of coupling shown in Fig. 19 between the shafts 152 and 153. This coupling consists of a tubular thimble 160 screw threaded on its exterior, which engages a cap 161 whose central portion is contracted and is also screw threaded. The adjoining ends of the shafts 153, 152 are flared outwardly and between these ends is placed a non-conducting disk 162. Sleeves 163 of non-conducting material are placed on the ends of the shafts 152, 153 and abut against the disk 162. As the cap and thimble are screwed together, these sleeves will be forced into very close frictional engagement with the flared ends of the shafts 152 and 153, and thus the two shafts will be held together and will move as one. The upper end of the shaft 153 is rotatably mounted in a lug 131ˣ which projects from the casing 131. The interior of this lug is of course provided with the insulating sleeve 165 shown in Fig. 18.

*Cooling system.*—Of course in an interior combustion engine, it is necessary that the walls of the piston chamber should be cooled and in the peculiar form of internal combustion chamber devised by me, it is necessary that the eccentric body 60 should also be cooled. I have devised for this means a system wherein either water or gasolene is circulated through channels or ducts formed in the walls of the cylinder and in the body of the eccentric and this system is described in detail and claimed in separate applications made by me on the 12th day of October, 1908, and numbered 457,349, 457,350. In order that my engine may be understood completely, I show these ducts and channels, though I do not need to go into any extended description thereof. Briefly the central fixed shaft is provided with a longitudinal duct 170 which extends along practically the whole length of the shaft and beneath the piston cylinder. The exact form of construction of these ducts is not necessary to detail as it is fully set forth in my pending application. The wall 74 which divides the compression chamber 70''' from the exhaust chamber 70'' is hollow and is connected by ports to the duct 170 so as to permit a circulation of cooling fluid into the wall 74, and thus prevent all chance of igniting the compressed mixture in the compartment 70''' by the wall becoming overheated by contact with the exhaust gases in the compartment 70''.

At its extremity, the duct 170 is connected to an annular chamber 171 formed in the head 52. This annular chamber in turn communicates with an internal chamber formed in the walls of the cylinder 50 and of the partition 54. This chamber 172 communicates with an annular chamber 173 in the head 51, and from thence passes into a duct 174 formed in the hub 51'. From this duct the fluid may either pass out by the rotating discharge nozzle 175 or by means of the pipe 176 which is connected to the gasolene tank 177. If water is supplied from the water tank 179 through the pipe 179ª, it passes through the various ducts and channels heretofore described and out through the nozzle 175, but if gasolene is used as a cooling means, it passes from the tank 177 to the pipe 178, thence downward into the various ducts and chambers, and out through the pipe 176, to be again returned to the tank 177, thus securing a constant circulation of the gasolene, which will absorb the heat from the cylinder and thus become warmed into better condition for vaporization.

While I have shown details which will make my engine a completely operative one either for steam or for an explosive mixture, I do not wish to be limited thereto, as of course details of construction and the arrangement of parts may be varied in many ways without departing from the spirit of my invention.

In Figs. 16 and 17 I show a modified manner of attaching the piston blades to the sleeve which surrounds the internal cylinder, 60. In these the sleeve is made in two lateral halves 180 and 181. Each piston blade, 182, is pivoted to the portion 180 by the lugs 184, and extends out from the edge of the ring portion 180 across the face of the portion 181. The portion 181 is recessed as at 183, thus providing two upstanding shoulders 185 which act to limit the circumferential movement of the blade 182 and the portion 180 relative to the portion 181. Packing, 186, is provided between the adjoining edges of the two portions 180 and 181 so as to prevent the passage of steam through the joint at this point.

The arrangement shown in Figs. 16 and 17, when combined with the construction previously described, permits of self-ignition and of having the fuel compression chamber shut during the period when the loading chamber is open to the explosion chamber. With this construction a series of three ports on the inlet end of the cylinder 181 can be made to serve for intake ports in both forward and reverse directions, the cutaway portion or recess 183 permitting the sleeve portion 181 to drop behind the length or extent of said cut-away recess, thus passing the intake port from the front of the blade to the back thereof. The portion 180 has six ports arranged in pairs, all serving as exhaust ports in series of twos, 180ᵇ, on reaching the exhaust side.

It may be pointed out that the inlet passage and the outlet passage in the eccentric may be in communication, thus forming a loading chamber. Any cavity, however, in the eccentric may form an extension to the loading chamber. Two or three ports serve as exhausts upon the first change from pressure to exhaust and when only near the close of the stroke, it, of course, being understood that the cut-off ring 100 is not needed for steam.

The operation of the double form of my invention shown in Figs. 9 to 15, inclusive, as a double expansive engine is evident, it, of course, being understood that the ring 100 is not needed, nor, of course, the igniting and timing arrangement shown, the engine acting as a mere doubling of the engine shown in Figs. 1 to 7, and merely having two piston chambers, one larger than the other, the steam being used primarily in the first or smaller chamber and then passing to the larger chamber and expanding still farther to do its work. Steam enters the first chamber through the port 70ª and through the eccentric and the sleeve surrounding the eccentric. It acts upon the blade in advance of the port through which it enters and drives it around until the inlet ports have closed and the blade behind it has passed the inlet passage in the eccentric, 61, and its inlet port has registered with the inlet passage. The space between the blades is now full of steam which has partly done its work and remains full until the outlet port of the chamber 91 registers with the outlet passage of the eccentric, 61, whereupon, as the cylinder wall and the face of the eccentric come together, the steam in this space will be forced out through the outlet passage and into the intermediate chamber, $70'''$, of the inner valve. The inlet passage, $60^a$, of the second piston chamber 90 will now be in alinement with the port $70^d$ of the valve and steam will expand into the piston space, 90, of the second or larger cylinder, acting against the adjacent blade therein to force it around until the ports of that piston space are closed, this point being the point of "cut off." The steam now expands and when the exhaust ports of this piston space register with the exhaust passage, $60^b$, the steam will be forced out therethrough into the exhaust chamber, $70''$ of the central valve 70 and so out of the engine.

While I have spoken above of the ring 100 as not being used for steam, it is to be understood that while it may be present, it may be fixed or attached to the eccentric so that its ports always register with the passages of the eccentric and that it will thus not have its precise function as a cut-off and as a sparking ring dividing the loading chamber from the compression chamber.

As an internal combustion engine, the operation is as follows: The first cylinder or piston chamber acts on its inlet side to draw in the explosive vapor through the inlet port, $70^a$, of the central valve and then compresses the vapor and forces it out on its outlet side through the outlet port, $70^c$, by the coming together of the internal and external surfaces of the piston casing and eccentric. The vapor is thus forced under compression into the compression chamber, $70'''$, where it is held under compression until the perforations of the ring, 100, are in alinement with the inlet passage, $60^a$, of the eccentric. When this occurs, the compressed charge rushes into the passage, $60^a$, but cannot pass out into the piston chamber because the ports in the sleeve do not register with the passages, $60^a$. The passage $60^a$ therefore forms a loading chamber in which the charge of vapor is held under compression.

It will be seen from Fig. 15 that the ports of ring 100 are in advance of ports $80^a$ of sleeve 80, and, hence, that the ring 100 has just closed the inner end of the passage $60^a$ when the ports $80^a$ begin to register with the other end of the passage, and that, therefore, there is absolutely no communication between the piston space and the interior valve space or compression chamber $70''$. It will also be seen from Fig. 15 that at this time the blade $94^a$ has passed the passage $80^a$. Under these circumstances ignition (by means of the sparking apparatus shown) may now take place at any time desired and the explosion will drive the blade $94^a$ forward. Of course, the explosion may take place after the port $80^a$ has passed the passage $60^a$.

While I may use electrical or any other direct method of firing the charge, I may make use, as an igniting means, of the hot gases passing out through the exhaust passage from the piston space opposed to the one wherein the explosion is to occur. This peculiar means of ignition is also shown in Fig. 15. In this figure it will be noticed that the adjoining surface of the eccentric and piston casing do not quite meet so that a slight space, X, is left between the surfaces, this space connecting the piston space, C', with piston space $C^2$. The compressed charge from the loading chamber is rushed into the space C' through the port $80^a$, while the exhaust gases are rushing in from piston space, B, through the port $80^b$ into the passage $60^b$. In the position of the parts shown in Fig. 15, the ring 100 has closed the inner end of the loading chamber and the sleeve 80 has rotated just sufficiently so that its port $80^a$ of piston space C' has just begun to uncover the outer end of the loading chamber. The compressed charge rushes through the port and is forced backward through the space X into the space $C^2$. It will be seen that the outlet ports, $80^b$, of the sleeve are circumferentially extended on their inner sides as shown at Z and, hence, have not yet passed the outlet passage $60^b$. As a consequence, the compressed charge meets the hot exhaust gases still flowing out of the port $80^b$ of the space $C^2$ is ignited, and the ignition is communicated to the charge in space C', which, of course, explodes, driving the piston forward. Upon the ports $80^b$ of the sleeve alining with the exhaust passage $60^b$, the exhaust gases are forced out through the passages into the exhaust chamber, $70''$ and so out of the engine through the tubular shaft.

It will be seen that with my engine used as an explosive engine, the cut-off ring performs a most important function, namely, that of cutting off completely the piston space from the compression holding chamber, $70'''$. In conjunction with the sleeve 80 it also acts as a gas lock, preventing the piston space having at any time a communication with the compression chamber, and thus preventing all chance of back-flare.

The operation of the rotatable central valve, 70, by means of the crank 141 is evident from the drawings. Upon a movement of the crank in one direction or the other, the sleeve 131 is moved backward or forward upon the rotating end of the tubular portion 53. This, of course, acts to move the cross head 123 which shifts the tubular connection 122, the transverse pin of which engages with the spiral slot 121' to turn the tubular valve 70 in one direction or the other, depending upon the direction of movement of the tubular portion 122. At the same time that the arm 141 is moved, the shafts 153 are also actuated to either force the contact terminal on one side or the other into the path of movement of the contact piece on the cylinder, and thus compel a sparking upon one side or the other side of the cylinder, depending upon the direction of rotation of the engine.

If the arrangement above stated for self-ignition is used, it is to be understood that the ignition by electric spark is only used to primarily start the engine upon the first ignition or until it becomes hot enough so that the charge will ignite and explode upon a flare-back, as before stated.

It is to be understood in connection with the foregoing description and with the claims appended that the sleeve surrounding the eccentric in both forms of my invention is part of the blade and is the means whereby the blade is held in close, steam-tight contact with the circumference of the eccentric, as well as the means whereby the ports are opened and closed for the admission and exhaust of motive fluid. It will also be seen that the central eccentric cylinder forms an eccentric abutment against which the motive fluid presses to force forward the piston blade. Hence, the eccentric forms not only an abutment for this purpose, but also a tubular body permitting the introduction of motive fluid to the piston chambers.

While I have shown what I believe to be the best form of my invention, it is to be understood that I do not wish to be limited to the exact arrangement of parts shown or to the details of construction. These may be varied without in any manner departing from the principle of my invention and may be changed to adapt the engine to various uses. Power may be taken from the outer cylinder itself, or may be taken from the rotating tubular extensions or hubs supporting it.

From the foregoing it is thought that the construction, operation and many advantages of the herein described invention will be apparent to those skilled in the art without further description, and it will be understood that various changes in the size, shape, proportions and minor details of construction may be resorted to without departing from the spirit or sacrificing any of the advantages of this invention.

Having thus fully described my invention, what I claim as new, and desire to secure by Letters Patent, is:—

1. In a rotary engine, an external cylindrical casing and an internal cylinder eccentric to each other, radially movable blades carried by one of said cylinders, the internal cylinder having an inlet passage and an outlet passage diametrically opposed to each other and located at opposite ends of the cylinder, a rotatable element on the internal cylinder, and means for connecting the blades with the element to move therewith.

2. In a rotary engine, an external piston casing carrying inwardly and outwardly sliding blades each mounted for lateral oscillatory movement to and from opposite sides of the radius of the external casing and a fixed internal cylinder eccentrically set to the axis of the exterior casing, a carrier for the blades upon said cylinder and means for admitting motive fluid to the space between the casing and eccentric and exhausting it therefrom.

3. A rotary engine including an external rotary piston casing carrying centrally projecting, radially movable blades, a fixed internal cylinder, eccentric to the axis of the external casing, an annular carrier mounted on and extending around the circumference of the internal cylinder for supporting the inner parts of the blades and rotatable with the latter, and means for admitting motive fluid to the space between the casing and eccentric and exhausting it therefrom, said external casing having transverse outwardly extending pockets into which the piston blades are received.

4. A rotary engine including an external rotary piston casing provided with transverse pockets, the walls of which are outwardly inclined, blades in each of said pockets, and movable inwardly and outwardly toward and from the center of the casing, a fixed internal cylinder, eccentric to the axis of the external casing, and means for admitting fluid to the space between the casing and eccentric and exhausting it therefrom.

5. A rotary engine including an external rotary piston casing having transverse pockets, centrally projecting radially movable blades mounted in said pockets, a fixed internal cylinder eccentric to the axis of the exterior casing, a sleeve surrounding and rotatably mounted upon said cylinder to which the inner ends of the blades are pivotally attached, and means for admitting motive fluid to the space between the casing and eccentric and exhausting it therefrom.

6. A rotary engine including an external rotary piston casing, a fixed internal cylinder, a rotatable sleeve surrounding the internal cylinder, radially movable blades carried by the piston casing, said blades on their inner ends having a pivotal and circumferential sliding engagement with the said sleeve, and means for admitting motive fluid to the space between the casing and eccentric and exhausting it therefrom.

7. A rotary engine including an external rotary piston casing having transverse blade pockets formed therein, a fixed internal cylinder eccentric to the axis of the piston casing, a sleeve surrounding the interior cylinder and rotatable thereon, said sleeve having a circumferential groove, blades carried in the pockets of the piston casing and inwardly projecting, the inner end of said blades pivoted to a base and engaging in the groove of said sleeve for a backward and forward movement around the cylinder, and means for admitting and exhausting motive fluid in the space between the casing and eccentric.

8. A rotary engine including an external rotary piston casing having transverse pockets, and a fixed internal cylinder eccentric to the axis of the piston casing, a sleeve surrounding said cylinder and provided with ports adapted to engage with inlet and exhaust ports in the eccentric cylinder, and blades carried in the pockets of the piston casing, said blades having at their inner edges a pivotal and sliding engagement with the face of said sleeve.

9. A rotary engine including an external rotary piston casing provided with transverse pockets, a fixed internal cylinder eccentric to the axis of the piston casing, a sleeve surrounding said cylinder and provided with ports adapted to register with inlet and outlet ports in the cylinder, said sleeve having a circumferential groove, blades carried one in each of the pockets, and base pieces to which said blades are pivotally attached, said base pieces adapted to slide in the groove of the internal cylinder and being cut away at their middle to prevent obstructing the ports of said sleeve.

10. In a rotary engine, an exterior rotary piston casing, an internal fixed eccentric, blades mounted on the exterior casing and extending across the space between the face of the eccentric cylinder and the inner surface of the exterior casing, means whereby motive fluid may be admitted behind the piston blades, and exhausted from before the same, and means for permitting the piston blades to have a radial movement inward or outward, and a variable angular direction.

11. In a rotary engine, an external rotary piston casing, a fixed internal cylinder eccentric to the axis of the external casing, a sleeve surrounding the cylinder but rotatable thereon, inwardly-projecting blades carried by the piston casing and pivoted to the sleeve, means for permitting the blades to have radial movement, means for permitting the blades to vary in an angular direction, and means permitting the inner ends of the blades to approach nearer to or farther from each other while engaged with said sleeve.

12. In a rotary engine, an external casing and an internal cylinder set eccentrically to each other, radially-movable blades carried by the exterior casing and extending toward the internal cylinder, said internal cylinder having an inlet passage and an outlet passage diametrically opposite to each other and located at opposite ends of the cylinder, a central rotatable valve mounted within the internal cylinder and open at opposite ends of the engine for connection with supply and exhaust conduits and having an inlet portion adapted to open into said inlet passage, and an outlet portion adapted to open from the said outlet passage of the central cylinder, and means connecting the valve with the casing to rotate therewith.

13. A rotary engine having a series of piston chambers, pistons rotatably mounted in each chamber and including blades, a common casing surrounding the pistons and connected with and rotatable by the blades thereof, and means whereby motive fluid may be carried successively from one cylinder to the next and exhausted from the final cylinder.

14. A rotary engine having two piston chambers including a single external rotatable element and a plurality of rotatable internal elements forming the inner and outer walls of the chambers, one of said chambers being adapted to receive motive fluid and to force said fluid into the next succeeding chamber, piston blades rotatably mounted in each of said chambers and connected with both elements for rotating the same simultaneously, and means for conducting the motive fluid from the first-named chamber to the second.

15. A rotary engine having a series of piston chambers, a motive fluid inlet into the first chamber, an outlet from the last chamber, an intermediate transmission chamber connecting alternately with one or the other of two adjacent chambers and acting to transmit fluid from one chamber to the other, piston blades mounted rotatably in each piston chamber, and means for rotating the intermediate chamber synchronously with the blades to cut the said chamber into and out of communication with the piston chambers.

16. A rotary engine having a series of piston chambers, each of said chambers being adapted to receive motive fluid and to force said fluid out therefrom, a series of rotatable blades mounted in said chambers, a tubular inlet chamber having a port adapted to register with the inlet port of the first piston chamber of the series, an intermediate transmission chamber having a port adapted to register with the outlet port of the first piston chamber and a port adapted to register with the inlet port of the next succeeding piston chamber, and an outlet chamber having a port adapted to register with an outlet port in the last named piston chamber, said inlet, intermediate and outlet chambers being formed in a single rotatable element operatively connected with the blades to rotate therewith.

17. A rotary engine having a series of piston chambers longitudinally succeeding each other on a common axis of rotation, each of said piston chambers having stationary inlet and outlet ports, each of said chambers being adapted to receive fluid through the inlet port and force it out through the outlet ports, an intermediate transmission chamber concentrically mounted relatively to each two piston chambers having ports communicating alternately with the outlet port of the first piston chamber and the inlet port of the next succeeding piston chamber, piston blades rotatably mounted within each piston chamber, a device mounted to reciprocate longitudinally of the axis of rotation of the engine for throwing the valve chamber into and out of register with the piston chambers, and means operatively connected with the valve chamber and blades for simultaneous rotation of the blades and chamber.

18. A rotary engine having two piston chambers longitudinally succeeding each other on a common axis of rotation and both having centrally-opening inlet and exhaust ports, a central valve chamber having longitudinally-separated ports on opposed sides, one adapted to register with the outlet port of the first chamber and the other with the inlet port of the next succeeding chamber, piston blades rotatably mounted within said chambers, fluid supply and exhaust conduits at opposite ends of the engine, means carried by the valve for controlling the admission of fluid to the first chamber and the exhaust from the last chamber, and means for operatively connecting the valve with the rotating element of the engine for rotating the valve.

19. A rotary engine having two piston chambers longitudinally succeeding each other and rotatable about a common axis, a central tubular valve extending into each of said piston chambers, said valve being divided into an inlet chamber, an intermediate transmission chamber and an outlet chamber, the inlet chamber alining with the first piston chamber, the transmission chamber alining with both the first and second piston chambers and the outlet chamber alining with the second piston chamber, inlet and outlet ports in both piston chambers, and ports in the several valve chambers adapted to register with said piston chamber ports, the inlet ports of both piston chambers being opposed to the outlet ports thereof, and the inlet ports of the valve chambers being opposed to the outlet ports thereof, and a series of piston blades mounted within said piston chambers to be rotated by the pressure of motive fluid thereagainst.

20. In a rotary engine, two longitudinally succeeding piston chambers, each chamber having inwardly-extending radially-directed inlet ports and outlet ports, rotatable piston blades mounted in each chamber, a central valve chamber rotatable with the blades and having a port adapted to register with the outlet port of the first piston chamber, and a port adapted to register with the inlet port of the second piston chamber, and means whereby when the inlet port of the first chamber is closed, the inlet port of the second chamber may be opened, said valve chamber having a limited rotary movement independently of the blades for starting and stopping the engine.

21. In a rotary engine, an outer cylinder divided into a series of piston chambers by a transverse wall, and an inner cylinder in each of said chambers eccentric to the outer casing cylinder, radially-movable blades carried by one of said cylinders and extending toward the other cylinder, means for admitting motive fluid to the space between the inner and outer cylinders of the first chamber to act on either side of the blades, and means for conducting said motive fluid from the first piston chamber to the next succeeding chamber to act on either side of the blades therein for rotating the engine in either direction.

22. In a rotary engine, an external casing cylinder divided into a series of piston chambers by a transverse wall, an internal cylinder in each of said chambers eccentric to the outer casing cylinder, separate rotatable sleeves on the internal cylinder, radially-movable blades in each chamber at opposite sides of the said wall and carried by outer of said cylinders and said sleeve, the internal cylinder of each chamber having an outlet passage and an inlet passage diametrically opposed to each other and at opposite ends thereof, and means for conducting the motive fluid from the outlet passage of the first chamber to the inlet passage of the succeeding chamber.

23. In a rotary engine, an external casing cylinder rotatably mounted and divided into a series of piston chambers by a transverse wall and having a series of radial transverse pockets formed in its circumference, an internal cylinder in each of said chambers eccentric to the outer casing cylinder, radially-movable blades carried by the outer cylinder and located in said pockets for rotating the outer cylinder, the internal cylinder of each chamber having an inlet passage and an outlet passage diametrically opposed to each other and at opposite ends thereof, and means for conducting the motive fluid from the outlet passage of the first chamber to the inlet passage of the next succeeding chamber, said pockets having diverging side walls to permit the blades to rock from one side to the other of the pockets while moving inwardly and outwardly during the rotation of the blades with the external cylinder.

24. In a rotary engine, an external casing divided into a series of piston chambers by a transverse wall, said chambers being formed on their circumference with radially-extending transverse pockets, an internal cylinder in each of said chambers eccentric to the outer casing, radially-movable blades carried in the pockets of the outer casing cylinder and extending toward the inner cylinder, the internal cylinder of each chamber having an inlet passage and an outlet passage diametrically opposed to each other and at opposite ends thereof, and a central tubular valve within the internal eccentric cylinder having an inlet chamber provided with a port registering with the inlet port of the eccentric cylinder, an intermediate chamber having a port registering with the outlet passage of the eccentric cylinder leading from the outlet port of the first piston chamber and also provided with an outlet port in alinement with the inlet passage in the eccentric cylinder leading to the inlet port of the second piston chamber, and an outlet chamber having an outlet port adapted to aline with an outlet passage in the eccentric cylinder leading from the outlet end of the second piston chamber.

25. A rotary engine including an external rotary piston casing divided into a series of piston chambers by a transverse wall and provided with transverse radially-directed pockets, the walls of which are outwardly inclined, piston blades in each of said pockets and movable inwardly and outwardly toward and from the center of the casing, said blades forming driving means for the external casing, fixed internal cylinders in each of said piston chambers around which the blades rotate, said cylinders being eccentric to the axis of the external casing, and means for conducting fluid to the spaces between the casing and eccentric and exhausting it therefrom.

26. A rotary engine including external rotary casing cylinder inclosing piston chambers, a fixed internal cylinder in each of said chambers eccentric to the axis of the chambers, radially-movable blades carried by the outer cylinder for rotating the same and operatively connected with the internal cylinder, and means for admitting fluid to the space between the casing and eccentric cylinders of the first of said piston chambers, discharging it therefrom into the next successive piston chamber, and exhausting it from said last-named piston chamber.

27. A rotary engine including an external rotary piston casing divided into a series of piston chambers by a transverse wall, a fixed internal cylinder located in each piston chamber and eccentric to the axis of the exterior casing, radially-movable blades carried by the piston casing, a rotatable sleeve surrounding and rotatable on the eccentric cylinder to which said blades are pivotally connected, said blades forming connecting elements between the casing and sleeve for rotating the same simultaneously, and means for conducting motive fluid to the space between the casing and the eccentric of one of said piston chambers, discharging it therefrom into the next successive piston chamber, and exhausting it from the last-named piston chamber.

28. A rotary engine including an external rotary piston casing divided into a series of piston chambers by a transverse wall, a fixed internal cylinder within each piston chamber eccentric to the piston casing, a rotatable sleeve surrounding the eccentric in each piston chamber, radially-movable blades carried by the piston casing, said blades on their inner edges having a pivotal and circumferential sliding engagement with said sleeve, and means for admitting motive fluid to the space between the casing and eccentric of one chamber, discharging the fluid from said chamber into the next following chamber and exhausting it from the last-named chamber.

29. A rotary engine including an external rotary piston casing divided into a series of chambers by a transverse partition, a fixed internal cylinder eccentric to the axis of the piston casing, a sleeve in each piston chamber surrounding the internal cylinder and rotatable on said cylinder, each having a circumferential groove, blades carried by the piston casing and inwardly projecting, the inner ends of said blades being pivoted each to a base, said base engaging in the groove of said sleeve for a backward and forward movement around the cylinder, and means for admitting motive fluid to the space between the casing and eccentric of the first chamber, directing said motive fluid into the next succeeding piston chamber and exhausting the said fluid from the last-named piston chamber.

30. In a rotary engine, an external rotary piston casing, a fixed internal abutment, a support rotatable about the abutment radially-moving blades carried both by the piston casing and support, and means for directing motive fluid behind said blades on one side of said abutment and for exhausting motive fluid from before said blades on the other side of the abutment.

31. A rotary engine including an external rotary piston casing divided into two longitudinally successive piston chambers, a fixed internal abutment within the piston casing, radially-movable blades carried by the piston casing, a sleeve on said abutment, means in the abutment for directing motive fluid into the space behind the blade on one side of said abutment, means in the abutment for conducting motive fluid from the space before the blades on the other side of said abutment into the inlet side of the next succeeding chamber, and means in the abutment for exhausting motive fluid from the last succeeding chamber, said sleeve having ports for the passage of fluid to and from the chambers.

32. A rotary engine including an external rotary piston casing, a fixed internal abutment, a sleeve surrounding said abutment, and provided with ports adapted to register with inlet and outlet ports in the abutment, blades carried by the exterior piston casing, radially movable and engaging at their inner ends with said sleeve, and means for introducing motive fluid into the space behind said blades on one side of said abutment and withdrawing motive fluid from before said blades on the other side of said abutment.

33. In a rotary engine, an external rotary piston casing divided into two longitudinally-successive piston chambers, an internal fixed eccentric, piston blades on the exterior casing and extending across the space between the face of the inner eccentric and the inner surface of the casing in each of said piston chambers, means whereby motive fluid may be admitted behind said piston blades on one side of the fixed eccentric and exhausted on the other side of said eccentric from before the blades, and means for permitting the piston blades to have a radial movement inward or outward, a variable angular direction, and to approach nearer to or farther from each other as they move upon said eccentric.

34. In a rotary engine, an external casing divided into two longitudinally-successive piston chambers, an internal cylinder set eccentric to the external casing, radially-movable blades carried by the exterior casing, separate rotatable blade supports in the chambers encircling the internal cylinder, said internal cylinder having an inlet passage and an outlet passage opening into the first of said series of piston chambers, and a passage opening into the second of said piston chambers and being provided with means whereby the motive fluid issuing from the first piston chamber shall be conducted into the inlet opening of the second piston chamber.

35. In a rotary engine, an external casing divided into two longitudinally-arranged piston chambers, an internal fixed cylinder eccentric to the casing, radially-movable blades carried by the exterior casing and operatively connected with the interior cylinder, said internal cylinder having at one end an inlet and an outlet passage diametrically opposed to each other, and located within the first piston chamber of the series, and in alinement with the opposite ends thereof and having an inlet passage and an outlet passage at the opposite end of the cylinder in alinement with the second piston chamber, the inlet passage being arranged beneath one end of the second piston chamber and the outlet passage beneath the other end of said piston chamber, a central rotatable valve mounted within the internal cylinder having an inlet portion adapted to open into the inlet passage of the first piston chamber, an intermediate portion having a port adapted to register with the outlet passage of the succeeding piston chamber, and an outlet portion having a port adapted to register with the outlet passage from the second piston chamber.

36. In a rotary engine, an external rotatable casing divided into piston chambers, an internal fixed cylinder eccentrically arranged in the chambers of the casing and around which the latter rotates, a central rotatable valve mounted within the inner cylinder, radially-movable blades carried by the outer cylinder and projecting inwardly across the space between the casing and inner cylinder, diametrically opposed outlet passages and diametrically opposed inlet passages in the portions of the inner cylinder disposed in each chamber, said central rotatable valve being divided into three compartments, the forward compartment having at its open end means for admitting motive fluid and at its rear end a port adapted to register with one or the other of the inlet passages of the forward eccentric, the intermediate chamber being closed at the ends but provided with ports adapted to register with one or the other of the outlet passages from the forward portion of the inner cylinder and one or the other of the inlet passages to the rear portion of the inner cylinder, the outlet chamber of said rotatable valve being open at one end for the exhaust of motive fluid and at its other being provided with a port adapted to register with one or the other of the outlet passages of the rear portion of the inner cylinder.

37. In a rotary engine, the combination of a rotatable casing having a tubular trunnion at one end, a supply conduit opening into the trunnion, a fixed eccentric within the casing having a tubular trunnion projecting out of the casing at the end thereof opposite from the first trunnion, an exhaust conduit connected with the second trunnion, inlet and exhaust passages in the eccentric communicating with the first and second trunnions respectively, a rotary valve mounted in the eccentric and having ports adapted to register with the passages, means for operatively connecting the valve with the casing to rotate synchronously therewith to control the admission and exhaust of fluid to the engine, and means for operating the valve to start or stop the engine.

38. In a rotary engine, the combination of a rotatable casing having a tubular trunnion at one end, a supply conduit opening into the trunnion, a fixed eccentric within the casing having a tubular trunnion projecting out of the casing at the end thereof opposite from the first trunnion, an exhaust conduit connected with the second trunnion, inlet and exhaust passages in the eccentric communicating with the first and second trunnions respectively, a rotary valve mounted in the eccentric and having ports adapted to register with the passages, means for operatively connecting the valve with the casing to rotate synchronously therewith to control the admission and exhaust of fluid to the engine, means for operating the valve to start or stop the engine, a member rotatably mounted on the eccentric and so constructed as to prevent the closure of the said passages, and blades carried by the member and casing for rotating both the latter.

39. A rotary engine having two longitudinally-separated piston chambers, into one of which motive fluid is drawn and by which it is compressed, and in the other of which it is exploded and forced out, a compression chamber into which the compressed fluid is forced from the first chamber, from which it is drawn into the second chamber, and a single central rotatable valve for admitting the initial charge and transferring the compressed charge from the first to the second chamber and finally releasing the exploded exhaust gases.

40. A rotary engine having two piston chambers, a rotary blade within each of said chambers and a fixed abutment therein, an igniting mechanism in one of said chambers, a compression chamber having an inlet and an outlet port, one of said piston chambers having an inlet port and an outlet port diametrically opposed, said outlet port connecting with the inlet port of the compression chamber, the other of said piston chambers being provided with an inlet and an outlet port diametrically opposed to each other, the inlet port registering with the outlet port of the compression chamber, and a single valve extending longitudinally through the abutment and having tubular ends for admitting and exhausting fluid, said valve controlling the flow of fluid through said inlet and exhaust ports and operatively connected with the blades to rotate therewith.

41. A rotary engine having a compressing piston chamber and an exploding piston chamber, a rotary piston blade within each of said chambers, a fixed abutment therein, a charge-igniting mechanism in the explosion chamber, and a compression chamber having an inlet and an outlet port, the compressing chamber having a fluid inlet port and an outlet port, said ports being diametrically opposed and longitudinally separated from each other, said outlet port connecting with the compression chamber, and the explosion chamber being provided with diametrically opposed and longitudinally separated inlet and outlet ports, the inlet port thereof registering with the outlet port of the compression chamber and the outlet port being adapted to discharge the exhaust vapors.

42. A rotary engine having a piston chamber in which motive fluid is exploded, a rotary blade in said chamber, a fixed abutment therein, a source of compressed motive fluid supply, a loading chamber into which the compressed fluid is forced, means for opening the loading chamber to the piston chamber at predetermined periods at either side of the blade, means for firing the charge within the piston chamber at either side of the blade, and means for cutting off the loading chamber from the source of compressed fluid before the charge is exploded.

43. A rotary engine having a piston chamber in which motive fluid is exploded, a rotary blade in said chamber, a fixed abutment therein, a chamber in which motive fluid is forced under compression, a loading chamber contained within the abutment, means for connecting the loading chamber with the compression chamber at predetermined intervals, means for connecting the loading chamber with the piston chamber at either side of the blade at predetermined intervals, means for exploding the charge in the piston chamber, and means for cutting off the loading chamber from the piston chamber before the charge has exploded in the piston chamber.

44. A rotary engine having a piston chamber in which motive fluid is exploded, a rotary blade in said chamber, a fixed abutment therein, a source of compressed motive supply, a loading chamber into which the compressed fluid is conducted, means for opening the loading chamber to the piston chamber at predetermined periods, means for cutting off the loading chamber from the source of compressed motive fluid, and means for conducting the hot exhausted gases from a previous explosion into contact with the fresh charge of motive fluid and exploding the same after the loading chamber has been cut off from connection with the source of compressed fluid.

45. A rotary engine having a piston chamber in which motive fluid is exploded, a reversible rotary blade in said chamber, a fixed abutment therein, reversible means actuated by the engine for compressing motive fluid, a chamber into which the motive fluid so compressed is forced, a loading chamber, and means connecting the loading chamber with the compression chamber at predetermined intervals, means within the abutment for connecting the loading chamber with the piston chamber at predetermined intervals, means for exploding the charge in the piston chamber, and means within the abutment for cutting off the loading chamber from the compression chamber before the charge has exploded in the piston chamber.

46. A rotary engine including a cylindrical outer casing, a fixed internal cylinder eccentric to the outer casing, blades carried by one of the cylinders and extending toward the other cylinder, a chamber in which motive fluid is held under compression, a valve for conducting said compressed fluid into the space between said cylinders on one side of said blade, and conducting the exhausted vapors away from said space on the opposite side of said blade, means for exploding the charge in the space between the cylinders, and means separate from the valve for cutting off the compression chamber from the piston cylinder previous to firing of the charge.

47. A rotary engine including an outer cylindrical rotatable casing, a fixed internal cylinder eccentric to the outer casing, blades carried by the outer cylinder and extending toward the inner cylinder, a compression chamber in which motive fluid is held under compression, and an igniting mechanism within said cylinder, said internal eccentric cylinder being provided with passages connecting the compression chamber with the space between the cylinders, and a passage connecting said space with an exhaust outlet, said passages being longitudinally separated and located at opposite ends of the eccentric cylinder, and means mounted on the eccentric cylinder for cutting off communication between the compression chamber and the piston chamber previous to the ignition of the charge in the piston chamber.

48. A rotary engine including an outer rotatable casing, an inner fixed cylinder eccentrically set to the outer casing and having inlet and outlet passages therethrough, radially-movable blades carried by the outer casing and extending toward the inner cylinder, a central compression chamber connected to said inlet passage of the eccentric, means connecting the compression chamber with a source of compressed motive fluid, and a ring located within the wall of the eccentric cylinder having ports adapted to aline with the inlet passage of the eccentric cylinder, said ring being rotated by the outer casing to cut off connection between the compression chamber and the inlet passage of the eccentric.

49. A rotary engine, including an outer rotatable piston casing, an inner cylinder eccentric to the piston casing and having radially-extending outlet and inlet passages therethrough, radially-movable blades carried by the outer casing and extending toward the inner cylinder, a compression chamber having a port adapted to register with the inlet passage of the eccentric cylinder, and connected to a source of compressed motive fluid, and a ring located within the walls of the eccentric cylinder and cutting across the inlet passage therethrough, said ring being provided with inlet ports adapted to register with said passage, and said ring being connected to the outer cylinder to rotate therewith.

50. In a rotary engine an outer rotatable cylindrical casing, an inner fixed cylinder eccentric to the outer casing and having radial inlet and outlet passages at its opposite ends, blades carried by the outer casing and extending toward the inner cylinder, a central compression chamber concentrically located within the eccentric cylinder and having a port adapted to register with the inlet passage of the eccentric and connected to a source of compressed motive fluid, a ring located within the walls of the eccentric cylinder and registering with and cutting across the inlet passages thereof, said ring having perforations therethrough adapted to register with said passage, and a connection between the outer rotatable cylinder and said ring for rotating the same in time with the movement of the piston blades, but ahead of the same.

51. In a rotary engine, an outer rotatable cylinder, an inner fixed cylinder eccentric to the outer cylinder and having radial inlet and exhaust passages at its opposite ends, a central tubular valve located at the center of the eccentric cylinder, said valve being divided into a compression chamber and an exhaust chamber, the compression chamber having a port adapted to register with the inlet passage through the eccentric and connected to a source of compressed motive fluid, the exhaust portion of said tubular valve having an exhaust port diametrically opposed to the port in the compression chamber and connecting with an exhaust outlet, a rotatable ring mounted within the wall of the eccentric cylinder and having ports therethrough adapted to aline with the inlet passage of the eccentric cylinder, and means whereby said ring may be rotated by the outer casing in time with the movement of the blades, or behind the same.

52. In a rotary engine, an outer cylindrical rotatable cylinder, an inner tubular cylinder eccentrically set with relation to the outer cylinder and having radial inlet and exhaust passages at opposite ends thereof extending from the outer surface of the cylinder to the inner tubular portion, a central tubular valve within the eccentric cylinder divided into two chambers, one of which is connected to a source of compressed motive fluid and has a port adapted to register with the inlet passage of the eccentric cylinder and the other of which has an outlet port adapted to register with the outlet passage of the eccentric cylinder, blades carried by the outer cylinder and extending toward the inner cylinder, and a ring located within the wall of the eccentric cylinder at its inlet end having ports adapted to register with the inlet passage in the eccentric, said ring being rotated by the outer cylinder and so arranged relatively thereto that its ports are in advance of said blades.

53. In a rotary engine, an outer rotatable cylinder, an inner fixed tubular cylinder eccentric to the outer cylinder and having inlet and exhaust passages at opposite ends thereof extending from the outer surface of the eccentric to the surface thereof, a compression chamber located in the center of the eccentric and having a port adapted to register with the inlet passage of said eccentric cylinder and connected to a source of fluid supply, a sleeve surrounding the eccentric cylinder and having outlet and inlet ports therein adapted to register with the passages in the eccentric, blades carried by the outer cylinder and engaging with the sleeve to rotate the sleeve about the eccentric, and igniting means attached to the outer cylinder to ignite the charge to explode the motive fluid.

54. In a rotary engine, an outer rotatable piston carrying cylinder, an inner cylinder eccentrically set to the outer cylinder and having radial inlet and exhaust passages therethrough, a compression chamber having a port adapted to register with the inlet passage of the eccentric and connected to a source of fluid supply, a sleeve surrounding the eccentric cylinder and rotatable thereon, said sleeve having a circumferential groove on its outer surface, and blades radially movable and carried by the outer cylinder having their inner ends provided each with a base portion adapted to slidably engage the groove in said sleeve.

55. A rotary engine having an outer cylindrical piston casing divided into a compressing chamber and an explosion chamber, a central fixed cylinder eccentrically set with relation to the outer casing and extending into both of said chambers, said eccentric cylinder being provided with an inlet passage leading into the compressing chamber and an outlet passage leading therefrom and with an inlet passage into the explosion chamber, and an outlet passage leading therefrom, blades carried by the outer cylinder and operatively connected with the eccentric cylinder, and a central tubular valve carried within the eccentric cylinder having an inlet chamber provided with a port adapted to register with the inlet passage of the compressing chamber, a compression chamber having a port adapted to register with the outlet passage from the compressing chamber, a port opposed to the first inlet port and adapted to register with the inlet passage of the explosion chamber, and an exhaust chamber having a port adapted to register with the outlet port of the explosion chamber.

56. A rotary engine including an outer rotatable cylinder divided into a compressing chamber and an explosion chamber, a fixed central cylinder eccentrically set with relation to the outer cylinder and extending into both of said chambers, said eccentric cylinder in that portion beneath the compressing chamber having an inlet passage and an outlet passage longitudinally separated, and in that portion beneath the explosive chamber having an inlet passage and an outlet passage longitudinally separated, both of said inlet passages being diametrically opposed to both of said outlet passages, a central tubular valve divided into an inlet chamber, a compression chamber and an exhaust chamber, the inlet chamber being provided with a port adapted to register with the first inlet passage in the eccentric cylinder, the compression chamber having a port at one end adapted to register with the outlet passages through the eccentric from the compression chamber, and an outlet port registering with the inlet passage through the eccentric to the explosion chamber and the exhaust chamber of the valve being provided with a port adapted to register with the outlet passage from the explosion chamber, a sleeve in each of said chambers surrounding the eccentric cylinder and ported to correspond therewith and to register with the passages through said eccentric cylinder, and radially-movable blades carried by said outer cylinder engaging and rotatable with said sleeve.

57. In a rotary engine, an outer rotatable cylinder, an inner fixed cylinder eccentric to the outer cylinder, a partition extending inwardly from the outer cylinder into contact with the inner cylinder and dividing the piston blades between the two cylinders into a compression chamber, and an explosion chamber, said eccentric cylinder having diametrically-opposed, longitudinally-separated inlet and exhaust passages leading into opposed ends of the compression chamber and rotatably-arranged, diametrically-opposed longitudinally-separated inlet and outlet passages leading into the explosion chamber, a central tubular valve passing through the eccentric cylinder provided with an inlet chamber connected to a source of motive fluid and provided with a port adapted to register with the inlet passage into the compression cylinder, said valve having a port registering with the outlet passage from the compressing chamber and an outlet port at its other end adapted to register with the inlet passage for the explosion chamber and said valve having an exhaust chamber adapted to carry away the exhausted motive fluid and having a port adapted to register with the outlet port from the explosion chamber, inwardly projecting, radially-movable blades in each of said chambers carried by the outer cylinder, and a ring rotatably mounted within the wall eccentric cylinder having ports adapted to aline with the inlet passages through the eccentric to the explosion chambers, and means connecting said ring with said partition whereby the ring shall be rotated by the rotation of the outer cylinder.

58. In a rotary engine, an outer rotatable cylindrical casing, an inner fixed cylinder eccentrically set to the outer casing, a partition on the outer casing extending inwardly and engaging with the eccentric cylinder to divide the engine into a compressing chamber and an explosion chamber, said eccentric having opposed inlet and opposed outlet passages therethrough opening into each of said chambers at opposite ends thereof, blades carried by the outer cylinder and operatively connected with the eccentric cylinder, said blades being radially movable, and a central rotatable valve within the eccentric cylinder divided into an inlet chamber, a compression chamber and an exhaust chamber, the inlet chamber being provided with a port adapted to register with one or the other of the diametrically-opposed inlet passages of the eccentric leading to the compressing piston chamber, the compressing chamber being provided with diametrically-opposed inlet and outlet ports adapted to register with one or the other of the outlet passages from the compressing piston chamber and with one or the other of the inlet passages leading to the explosion chamber and the exhaust chamber having a port adapted to register with one or the other of the diametrically-opposed outlet passages through the eccentric from the outlet end of the explosion chamber.

59. In a rotary engine, a central fixed shaft provided with an eccentric portion, a rotatable cylindrical piston casing mounted on said shaft and rotatable there-around and inclosing the eccentric portion of the shaft, blades carried by the exterior piston casing and engaging with the interior eccentric portion of the shaft, a central tubular valve located within said shaft and extending through the eccentric portion thereof, a partition carried by the piston casing and extending inwardly into engagement with the eccentric portion of the shaft, said eccentric portion being provided with diametrically opposed inlet and outlet passages extending radially from the center of said shaft to the exterior of the eccentric portion and opening into opposite ends of the compressing and explosion chambers, said tubular valve being divided into an inlet chamber, a compression chamber and an exhaust chamber, said inlet chamber having a port adapted to register with the inlet passage through the eccentric to the first chamber, said compression chamber having at one end a port adapted to register with the outlet passage through the eccentric from the outlet end of the compressing chamber and provided with an outlet port adapted to register with the inlet passage through the eccentric leading to the inlet end of the explosion chamber, said exhaust chamber having an outlet port adapted to register with the outlet passage through the eccentric from the explosion chamber, means mounted on the exterior rotatable cylinder for igniting the charge in the explosion chamber and actuated by the rotation of the cylinder, and means for supplying explosive fluid to the inlet end of the inlet chamber of the central valve.

60. In a rotary engine, a central fixed shaft, a cylinder mounted upon said shaft and rotatable there-around and having at one end a tubular extension rotatable with the shaft, said central cylinder having inlet and exhaust passages longitudinally opposed and opening into the space between the outer and the inner cylinders, a tubular valve passing through the central shaft and having opposed inlet and outlet ports adapted to register with the inlet and outlet passages through the shaft, a spindle connected to the inlet end of said tubular valve and extending axially through the tubular extension of the outer cylinder, projecting pins on the spindle engaging with spiral slots in the inlet end of the tubular valve so that when the spindle is longitudinally moved the valve shall be rotated, a casing mounted on the end of the tubular extension of the outer cylinder but non-rotatable therewith, a traveler mounted in a circumferential slot on the exterior of said tubular extension, a pin connecting the spindle with said traveler, means for shifting the traveler longitudinally along the extension, and means for conducting explosive fluid to said casing.

61. A rotary explosion engine including an outer rotary cylinder, a fixed abutment, blades carried on the cylinder and projecting toward the fixed abutment, means for introducing compressed explosive fluid on one side or the other of said abutment, and discharging said fluid on one or the other side thereof, opposed igniting means located at diametrically opposite points in the outer rotatable cylinder, means for actuating said igniting means at a point on one or the other side of said abutment, and means for shifting said point of ignition in correspondence with the point at which inlet of motive fluid occurs.

62. A rotary explosion engine including an outer rotatable cylinder, a fixed abutment, blades carried on the outer cylinder and projecting toward the fixed abutment, means for introducing compressed explosive fluid shiftable to introduce said fluid on one side or the other of said abutment, means diametrically opposed to the introducing means for discharging exhausted fluid from one side or the other of the abutment, igniting means carried by the outer cylinder between each two blades, means for actuating the igniting means, and mechanism for shifting one or the other of said actuating means into engagement with the igniting means in correspondence with the movement of the fluid-introducing means.

63. A rotary explosion engine including an outer rotatable cylinder, a fixed abutment, blades carried in the cylinder and projecting toward the fixed abutment, a central rotatably-shifted valve adapted to direct motive fluid into said cylinder on one side or the other of the abutment, electrically-operating igniters carried by the outer cylinder between said blades, contact pieces carried on the exterior of the cylinder rotatable therewith and electrically connected to the igniters, opposed relatively-fixed contact pieces one on either side of said cylinder, and means for shifting said valve and correspondingly shifting one of said contact pieces into and the other out of engagement with the contact pieces on the cylinder to correspondingly shift the time of firing the charge.

64. A rotary explosion engine including an outer rotatable cylinder, a fixed abutment, blades carried in the cylinder and projecting toward the fixed abutment, a shiftable valve adapted to direct motive fluid into the said cylinder on one side or the other of the abutment, electrically-operating igniters carried by the outer cylinder between said blades, rotatable contact pieces carried on the exterior of the cylinder and electrically-connected to the igniters, shafts mounted one on either side of the cylinder carrying arms projecting therefrom in the same direction and provided with contact pieces adapted to engage one or the other with the contact pieces on the cylinder, means for shifting said inlet valve and connected to said shifting means for rotating the contact piece carrying shafts to turn one or the other into the path of movement of the cylinder contact pieces.

65. A rotary explosion engine including an outer rotatable cylinder, a fixed abutment, blades carried in the cylinder and projecting toward the fixed abutment, a central rotatably-shifted valve having a port adapted to direct motive fluid into the said cylinder on one side or the other of the abutment, electrically-operating igniters carried by the outer cylinder between said blades, opposed vertical shafts mounted one on either side of said cylinder and having arms projecting in the same direction and carrying contact pieces, electrical connections from said arms, crank arms mounted on said shafts, a transverse shaft connected to said crank arms to turn the same, and a crank connected to said valve-shifting mechanism and adapted to actuate said transverse shaft.

66. A rotary explosion engine including an outer rotatable cylinder, a fixed abutment, blades carried in the cylinder and projecting toward the fixed abutment, a central rotatably-shifted valve adapted to direct motive fluid into the said cylinder on one side or the other of the abutment, electrically-operating igniters carried by the outer cylinder between said blades, rotatable contact pieces carried on the exterior of the cylinder and electrically connected to the igniters, opposed shafts mounted one on either side of said cylinder and having arms projecting in the same direction and carrying contact pieces, a longitudinally-shifted sleeve connected to the central valve for rotating the same to one position or the other, a crank arm connected to a transverse shaft, a lever connected at one end to said longitudinally-movable sleeve and having a link connecting it to said crank arm, crank arms on the contact-piece carrying shafts, both projecting in the same direction, connections between said shaft crank arms and the sleeve-shifting lever, and means for insulating the upper ends of said contact-carrying shafts.

67. In a rotary engine, an outer rotary cylinder inclosing a piston chamber, a central cylinder eccentric to the outer cylinder and forming an abutment, said cylinders being spaced from each other at the point of nearest approach, blades carried by the outer cylinder within the piston chamber, means for directing explosive fluid into the piston chamber on one side of said abutment adjacent said point of nearest approach, and means for coincidentally exhausting the heated products of combustion on the other side of said abutment at said point whereby the fresh charge may be ignited from the exhaust.

68. In a rotary engine, an outer rotary cylinder inclosing a piston chamber, a central fixed cylinder eccentric to the outer cylinder and forming an abutment, blades carried by the outer cylinder within the piston chamber, means for admitting explosive fluid into the piston chamber on one side of the abutment, means for exhausting the fluid on either side of said abutment, and means for permitting a portion of the incoming charge to come into contact with a portion of the outgoing heated exhaust and thereby explode said fresh charge.

69. In a rotary engine, an outer rotary cylinder inclosing a piston chamber, a central fixed cylinder eccentric to the outer cylinder and forming an abutment, blades carried by the outer cylinder and projecting toward the inner cylinder, said cylinders being spaced from each other at the point of nearest approach, a loading chamber within the eccentric cylinder connected to a source of supply, means for cutting off the loading chamber from the source of supply and for opening the inlet from said chamber to the piston chamber at a point on one side of said abutment adjacent to the point of nearest approach between the cylinders, said cylinder being provided with a passage opposed to the loading chamber but opening to the piston chamber at the point adjacent to the point of nearest approach between the cylinders, means for cutting off the loading chamber from connection with the source of supply, means for admitting a charge from the loading chamber into the piston chamber behind a blade, and means for preventing the cutting off of the exhaust from the same piston blade until the fresh charge in that space has become ignited from said exhaust.

70. In a rotary engine, an outer rotatable cylinder inclosing a piston chamber, a central fixed cylinder eccentric to the outer cylinder and forming an abutment, said cylinders being spaced from each other at the point of nearest approach, blades carried by the outer cylinder and projecting toward the inner cylinder, means for admitting motive fluid on one side of said abutment at a point forward of the point of nearest approach between the cylinders and into the forward end of one of the spaces between the pistons, means for exhausting the burned products of combustion between two pistons on the opposite side of said abutment, and means for permitting a portion of the exhausted products to pass into the piston space receiving a fresh charge whereby the latter shall be exploded.

71. In a rotary engine, an outer rotatable cylinder inclosing a piston chamber, a central fixed cylinder eccentric to the outer cylinder and forming an abutment, said cylinders being spaced from each other at the point of nearest approach, and said inner cylinder having diametrically-opposed inlet and exhaust passages, blades carried by the outer cylinder and inwardly projecting therefrom, a sleeve surrounding the inner cylinder rotatable thereon and engaged with the blades for a rotatable movement, said sleeve having two ports between each two blades, one of said ports adapted to register with the inlet passage and the other with the outlet passage in the eccentric cylinder on one side and the other of the point of nearest approach between the outer and inner cylinders, and means for admitting motive fluid to the inlet passage of the inner cylinder.

72. In a rotary engine, an outer rotatable cylinder inclosing a piston chamber, a central fixed cylinder eccentrically mounted to the outer cylinder and forming an abutment, said cylinders being spaced from each other at the point of nearest approach, said inner cylinder being formed with opposed inlet and outlet passages opening one on either side of the point of nearest approach between the cylinders and said outlet passage being circumferentially extended, blades carried by the outer cylinder and inwardly extending and a sleeve surrounding the inner cylinder and engaged with said blades for rotatable movement therewith, said sleeve being provided between each two blades with ports, the inner side of said ports being longitudinally extended, the distance between said ports being such that when one of said ports in one piston blade is admitting motive fluid, the other of said ports shall have nearly passed the exhaust opening, and the adjacent port in the successive piston chamber shall be registering with said exhaust passage whereby communication may be provided between the fresh charge and the heated exhaust to explode the former.

73. In a rotary engine, an outer rotatable cylinder inclosing a piston chamber, a central fixed cylinder eccentric to the outer cylinder and forming an abutment, said eccentric cylinder being provided with an inlet passage and an exhaust passage diametrically opposed to each other, blades carried by the outer cylinder projecting into the piston chamber, means whereby the inlet passage in the eccentric cylinder may have communication with the space between two pistons for the purpose of charging this space with fresh motive fluid, and means whereby said exhaust passage may have communication with said piston space at the moment of explosion for permitting ignition of the fresh charge by the exhausted vapors.

74. In a rotary engine, an outer rotatable cylinder inclosing a piston chamber, a central fixed cylinder eccentric to the outer cylinder and forming an abutment, said eccentric cylinder being provided with an inlet passage and an exhaust passage diametrically opposed to each other, blades carried by the outer cylinder projecting into the piston chamber, means for supplying motive fluid to the inlet passage, means for cutting off communication between said inlet passage and the source of motive fluid supply, means for permitting the motive fluid contained within said passage after cut off to enter the piston chamber behind a blade and on one side of said abutment, means for exhausting the products of combustion from the next succeeding space on the other side of said abutment, and means for allowing a portion of said exhausted products to pass into the first piston space on the side of said abutment opposed to the space in which a charge is being admitted for the purpose of igniting said charge by said heated products.

75. In a rotary engine, an outer rotatable cylinder inclosing a piston chamber, a central fixed cylinder eccentric to the outer cylinder forming an abutment, said cylinders being spaced from each other at the point of nearest approach and the inner cylinder being provided with an inlet passage and an outlet passage diametrically opposed to each other and opening to the piston chamber on either side of said point of nearest approach, blades carried by the outer cylinder and projecting toward the inner cylinder across the piston chamber and forming a series of piston spaces between the blades, a ring located within said eccentric cylinder and rotatable with the outer cylinder, said ring being provided with ports adapted to register with the inlet passage of the eccentric cylinder in one position and to cut across said inlet passage in another, and means for admitting a portion of the burned charge being exhausted from one piston space into a piston space between the next adjacent piston blades at the time when the said ring has cut off said inlet passage from the source of supply.

76. In a rotary engine, an outer rotary cylinder inclosing a piston chamber, a central fixed cylinder eccentric to the outer cylinder and forming an abutment, a partition extending inwardly from the outer cylinder into engagement with the inner and dividing the piston chamber into two portions, said eccentric cylinder being provided with two diametrically-opposed inlet and outlet passages opening into opposite ends of the second chamber, the inlet passage of the second piston chamber forming a loading chamber, blades in each chamber carried by the outer cylinder and inwardly projecting, means for admitting motive fluid to the first piston chamber, means for compressing motive fluid therein and forcing it out into the inlet passage of the second chamber, means for cutting off communication between the inlet passage and a source of supply of compressed motive fluid, means for admitting the motive fluid in said inlet or loading chamber behind one of the pistons in the explosion chamber after the loading chamber has been cut off from the source of motive fluid supply, and means for igniting the compressed charge by permitting a portion of the heated exhaust vapors from a preceding piston chamber to pass into contact with the fresh vapors so admitted.

77. A rotary engine having an outer rotatable piston casing, an inner fixed cylinder, a sleeve surrounding and rotatable on the inner fixed cylinder, said fixed cylinder forming a support for the sleeve located within the casing, and blades supported on the rotatable sleeve but engaging with the outer cylinder to rotate the same, said sleeve preventing the blades from exerting any centrifugal pressure on the outer cylinder.

In testimony, that I claim the foregoing as my own, I have hereto affixed my signature in the presence of two witnesses.

OLAUS B. JACOBS.

Witnesses:
CARL MULLENDORE,
J. P. HATHENGLOE.